US012223603B2

(12) United States Patent
Kim et al.

(10) Patent No.: US 12,223,603 B2
(45) Date of Patent: Feb. 11, 2025

(54) METHOD OF LEARNING A TARGET OBJECT USING A VIRTUAL VIEWPOINT CAMERA AND A METHOD OF AUGMENTING A VIRTUAL MODEL ON A REAL OBJECT IMPLEMENTING THE TARGET OBJECT USING THE SAME

(71) Applicant: VIRNECT inc., Seoul (KR)

(72) Inventors: Ki Young Kim, Seoul (KR); Thorsten Korpitsch, Schwechat Wien (AT)

(73) Assignee: VIRNECT INC., Seoul (KR)

( * ) Notice: Subject to any disclaimer, the term of this patent is extended or adjusted under 35 U.S.C. 154(b) by 63 days.

(21) Appl. No.: 17/991,791

(22) Filed: Nov. 21, 2022

(65) Prior Publication Data
US 2023/0206566 A1 Jun. 29, 2023

(30) Foreign Application Priority Data
Dec. 29, 2021 (KR) .................... 10-2021-0191588

(51) Int. Cl.
*G06T 19/00* (2011.01)
*G06N 3/08* (2023.01)
(Continued)

(52) U.S. Cl.
CPC ............ *G06T 19/006* (2013.01); *G06T 15/20* (2013.01); *G06T 19/20* (2013.01); *G06V 10/74* (2022.01);
(Continued)

(58) Field of Classification Search
CPC ....... G06T 19/006; G06T 19/20; G06T 15/20; G06T 2219/2016; G06T 2215/16;
(Continued)

(56) References Cited

U.S. PATENT DOCUMENTS 9,489,040 B2 * 11/2016 Antonyuk ............... G06F 3/017
9,530,250 B2    12/2016 Mazula
(Continued)

FOREIGN PATENT DOCUMENTS

KR     20150067741 A    6/2015
KR      102110123 B1    5/2020

OTHER PUBLICATIONS

Wang Yue et al. "A LINE-MOD-based markerless tracking approach for AR applications" The international journal of advanced manufacturing technology, Springer, London, vol. 89, No. 5, pp. 1699-1707, Aug. 1, 2016 (Year: 2016).*

(Continued)

*Primary Examiner* — Wesner Sajous
(74) *Attorney, Agent, or Firm* — STIP Law Group, LLC

(57) ABSTRACT

Provided is a method of learning a target object implemented on a computer-aided design program of an authoring computing device using a virtual viewpoint camera, including displaying a digital model of a target object that is a target for image recognition, setting at least one observation area surrounding the digital model of the target object and having a plurality of viewpoints on the digital model, generating a plurality of pieces of image data obtained by viewing the digital model of the target object at the plurality of viewpoints of the at least one observation area, and generating object recognition library data for recognizing a real object implementing the digital model of the target object based on the generated plurality of pieces of image data.

9 Claims, 20 Drawing Sheets

(51) Int. Cl.
  *G06T 15/20*  (2011.01)
  *G06T 19/20*  (2011.01)
  *G06V 10/74*  (2022.01)
  *G06V 20/20*  (2022.01)

(52) U.S. Cl.
  CPC .......... *G06V 20/20* (2022.01); *G06T 2215/16* (2013.01); *G06T 2219/2016* (2013.01)

(58) Field of Classification Search
  CPC ............. G06T 5/00–08; G06T 7/11–13; G06T 15/003; G06T 15/08; G06T 15/10; G06T 15/205; G06T 15/50; G06T 17/05; G06T 2200/04–08; G06V 10/70; G06V 10/74–75; G06V 20/20; G06N 3/08–098; G06N 3/0985
  See application file for complete search history.

(56) References Cited

U.S. PATENT DOCUMENTS

| | | | |
|---|---|---|---|
| 10,762,702 B1 | 9/2020 | Dhua et al. | |
| 2013/0187852 A1* | 7/2013 | Ebina | H04N 13/398 345/158 |
| 2019/0279424 A1 | 9/2019 | Clausen et al. | |
| 2020/0371665 A1 | 11/2020 | Clausen et al. | |
| 2021/0104052 A1* | 4/2021 | Hayashi | G06T 7/248 |

OTHER PUBLICATIONS

A line-mod-based markerless tracking approach for AR applications (Year: 2016).*

The extended European search report of EP 22 20 8582, Apr. 5, 2023.

Yue Wang et al, A LINE-MOD-based markerless tracking approach for AR applications, The International Journal of Advanced Manufacturing Technology, Aug. 2016, vol. 89, No. 5, pp. 1699-1707, Springer, London, England.

Wang Li et al, Fully convolutional network-based registration for augmented assembly systems, Journal of Manufacturing Systems, 2021, vol. 61, pp. 673-684, Springer, New York City, USA.

Yue Wang et al, Mechanical assembly assistance using marker-less augmented reality system, Assembly Automation, 2018, vol. 38, No. 1, pp. 77-87, Emerald Publishing Limited, Bradford, United Kingdom.

Stefan Hinterstoisser et al, Model Based Training, Detection and Pose Estimation of Texture-Less 3D Objects in Heavily Cluttered Scenes, Computer Vision ACCV, 2012, pp. 548-562, Springer, Berlin, Germany.

* cited by examiner

[Fig. 1]
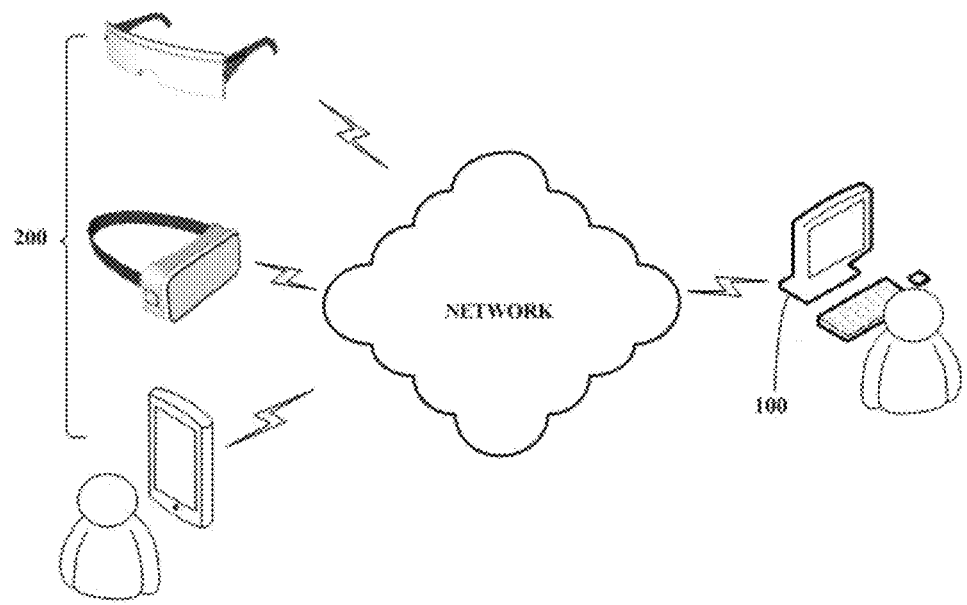

[Fig. 2]
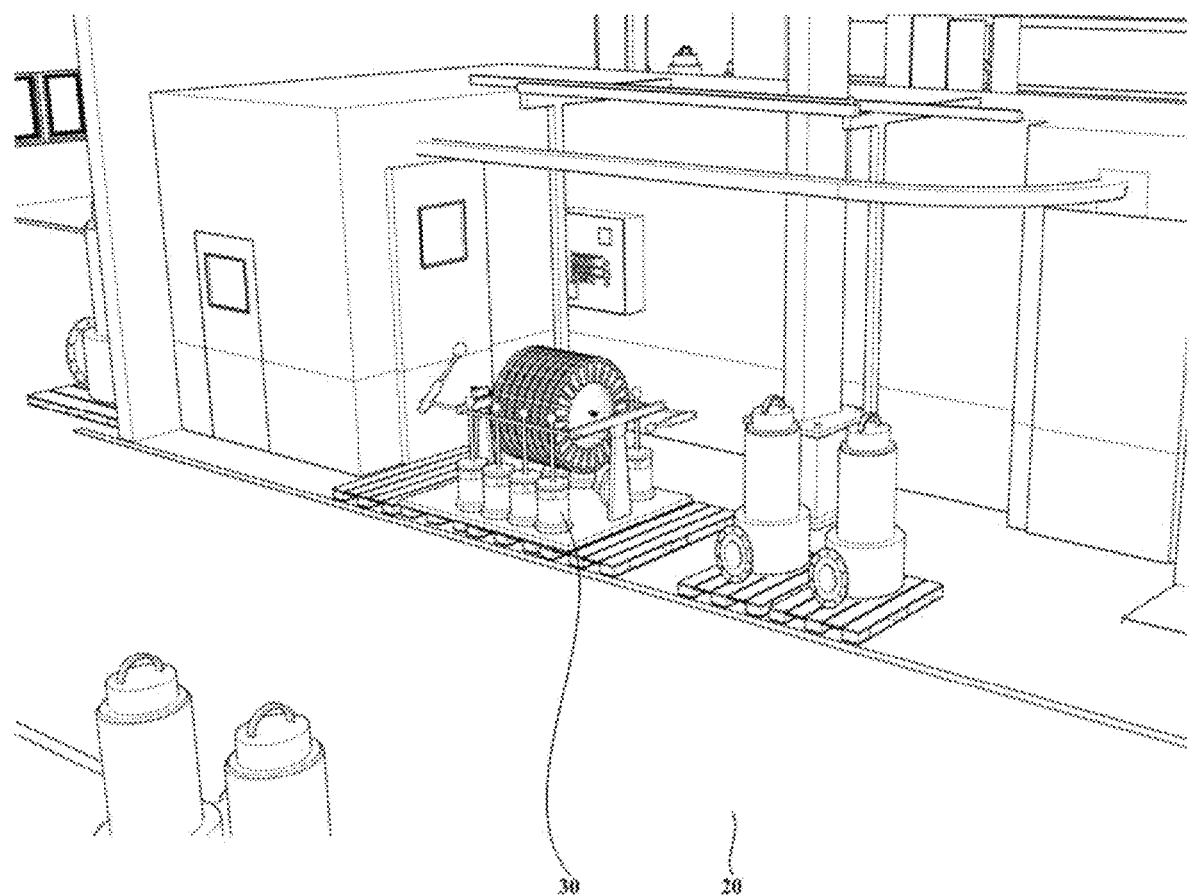

[Fig. 3a]
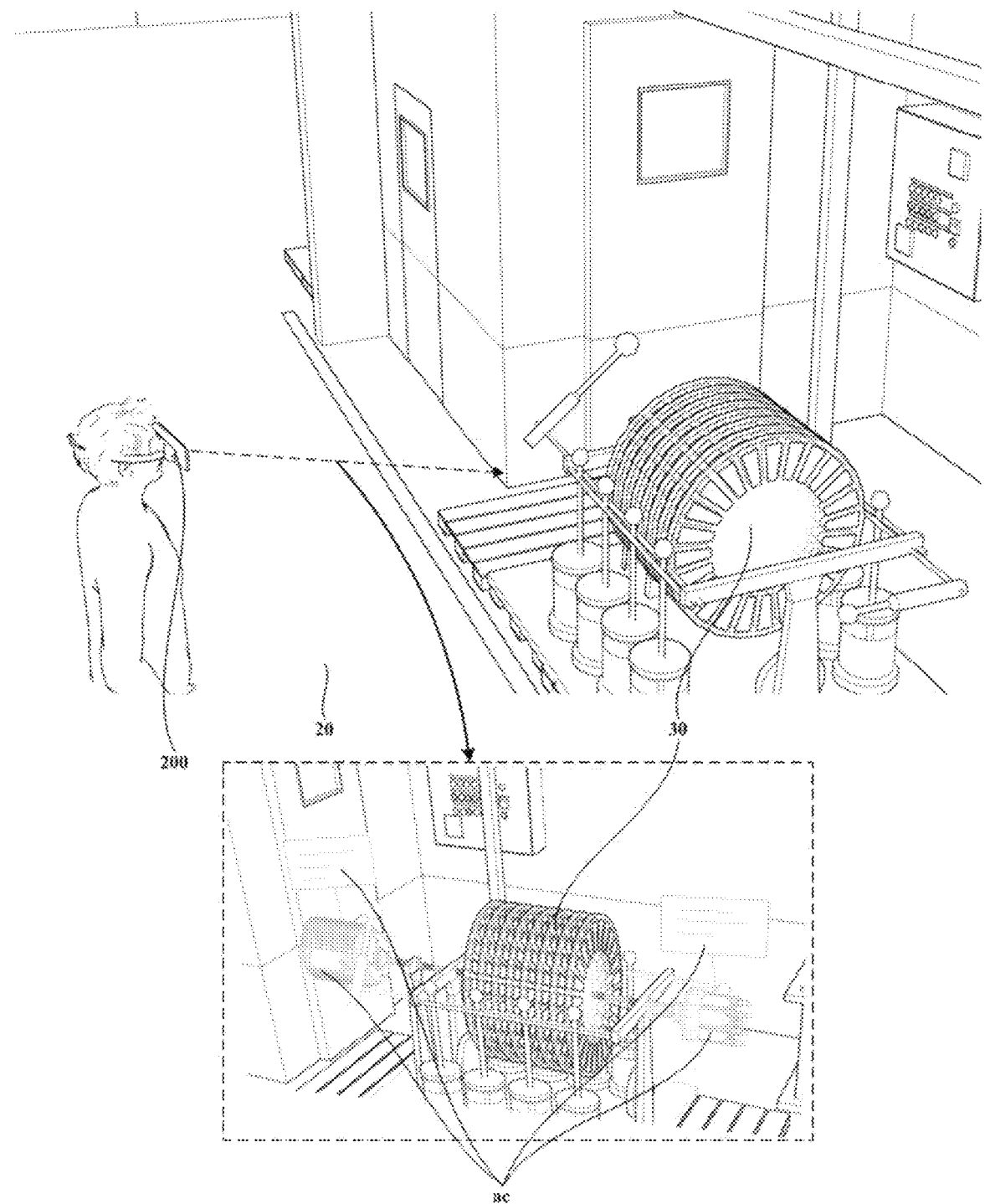

[Fig. 3b]
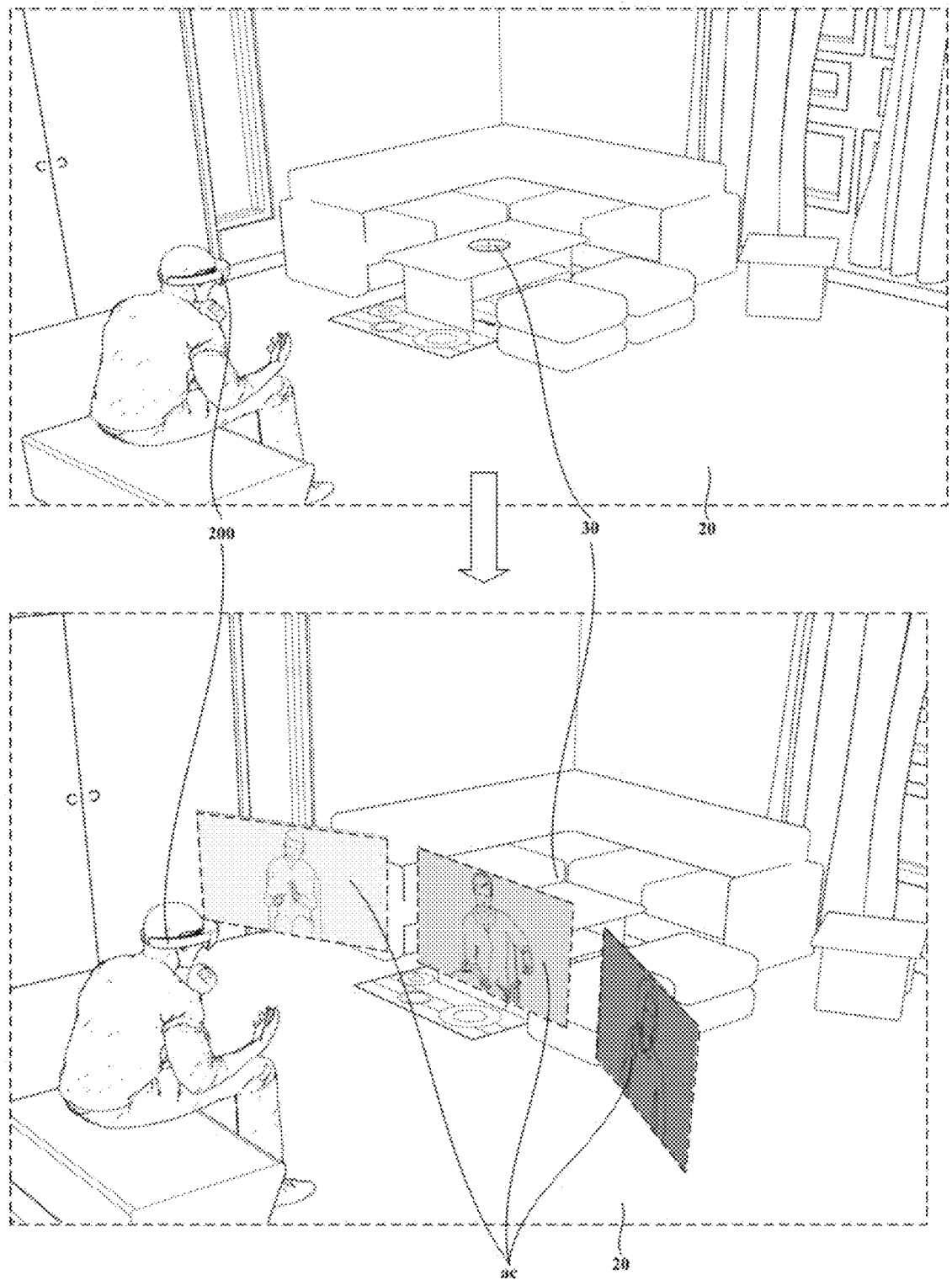

[Fig. 4]
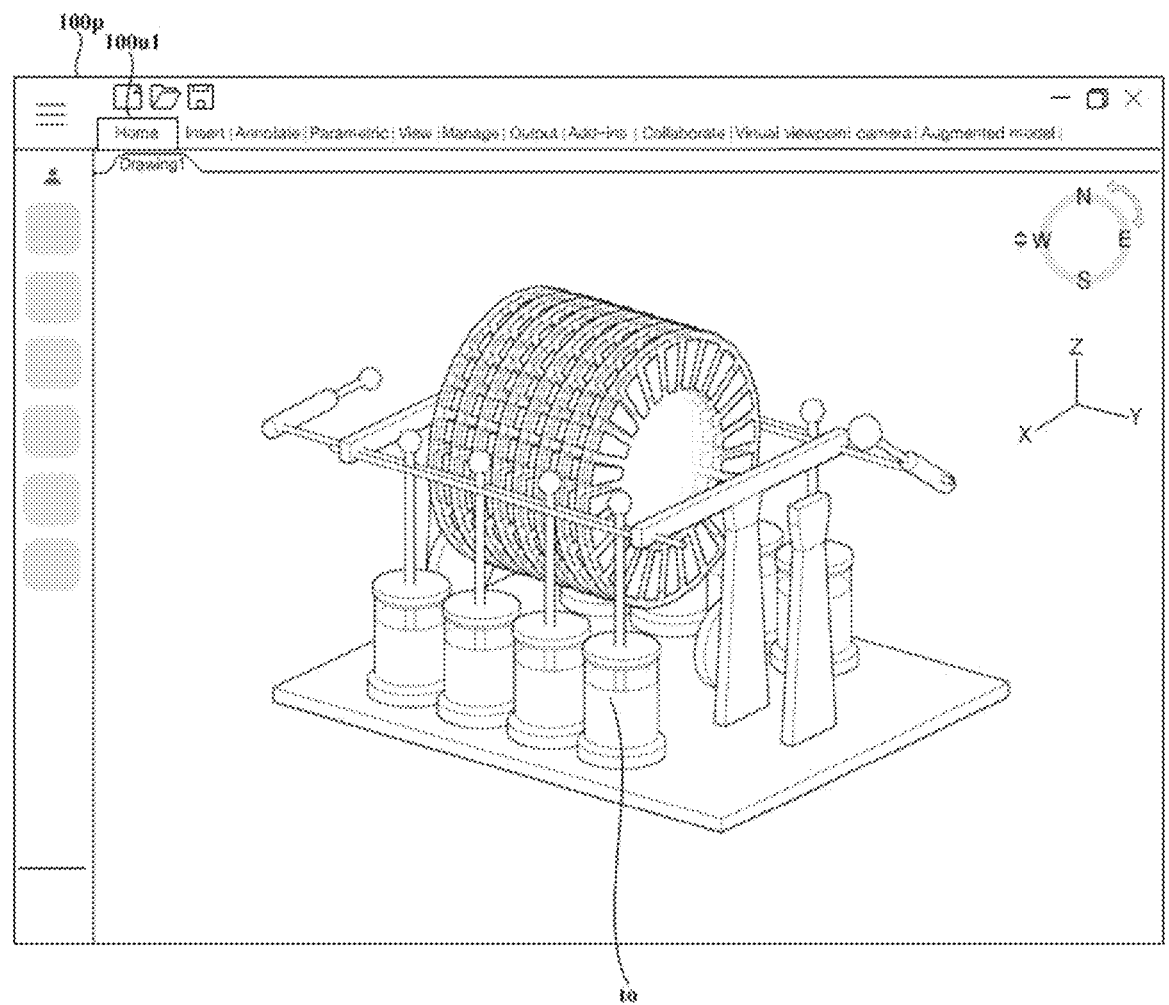

[Fig. 5]
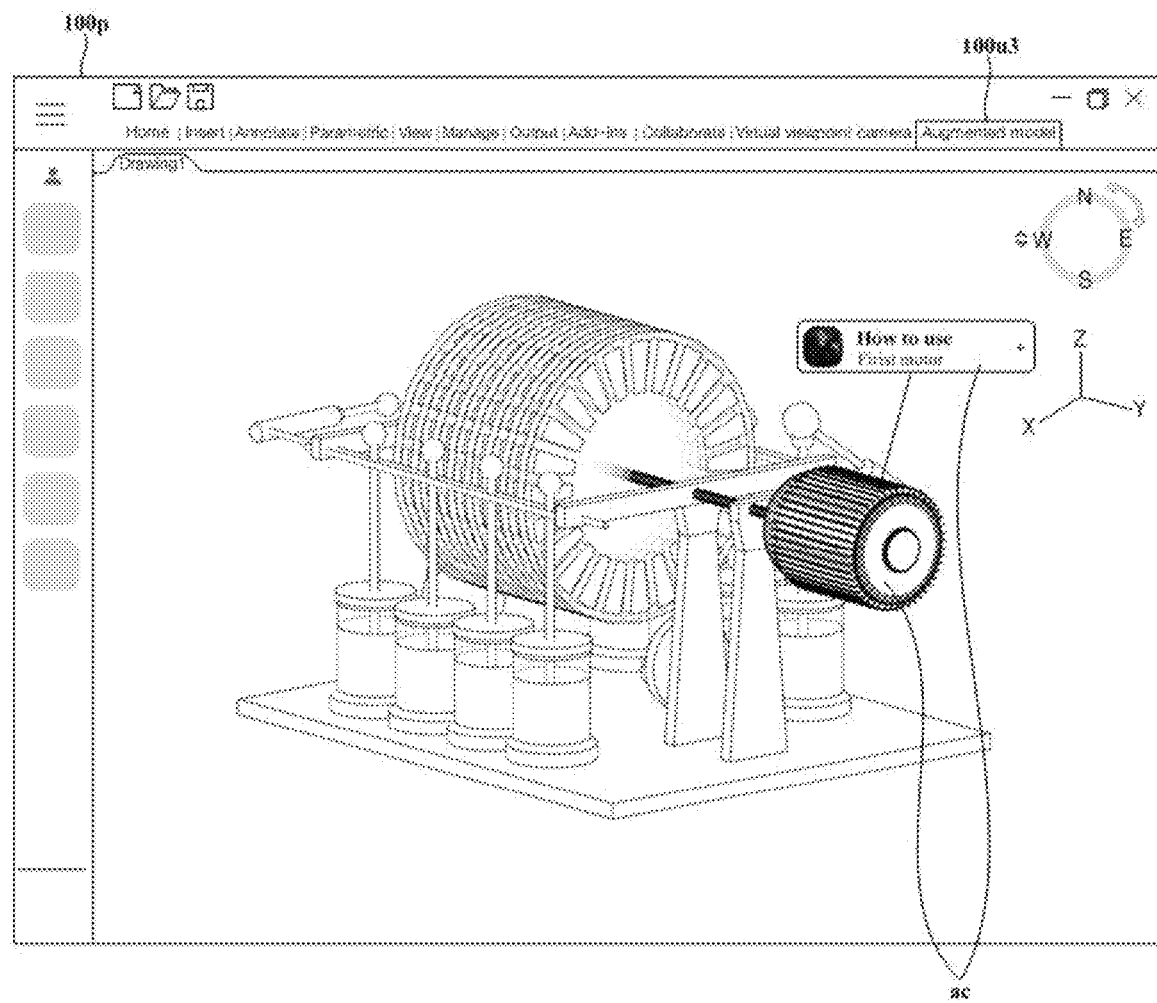

[Fig. 6]
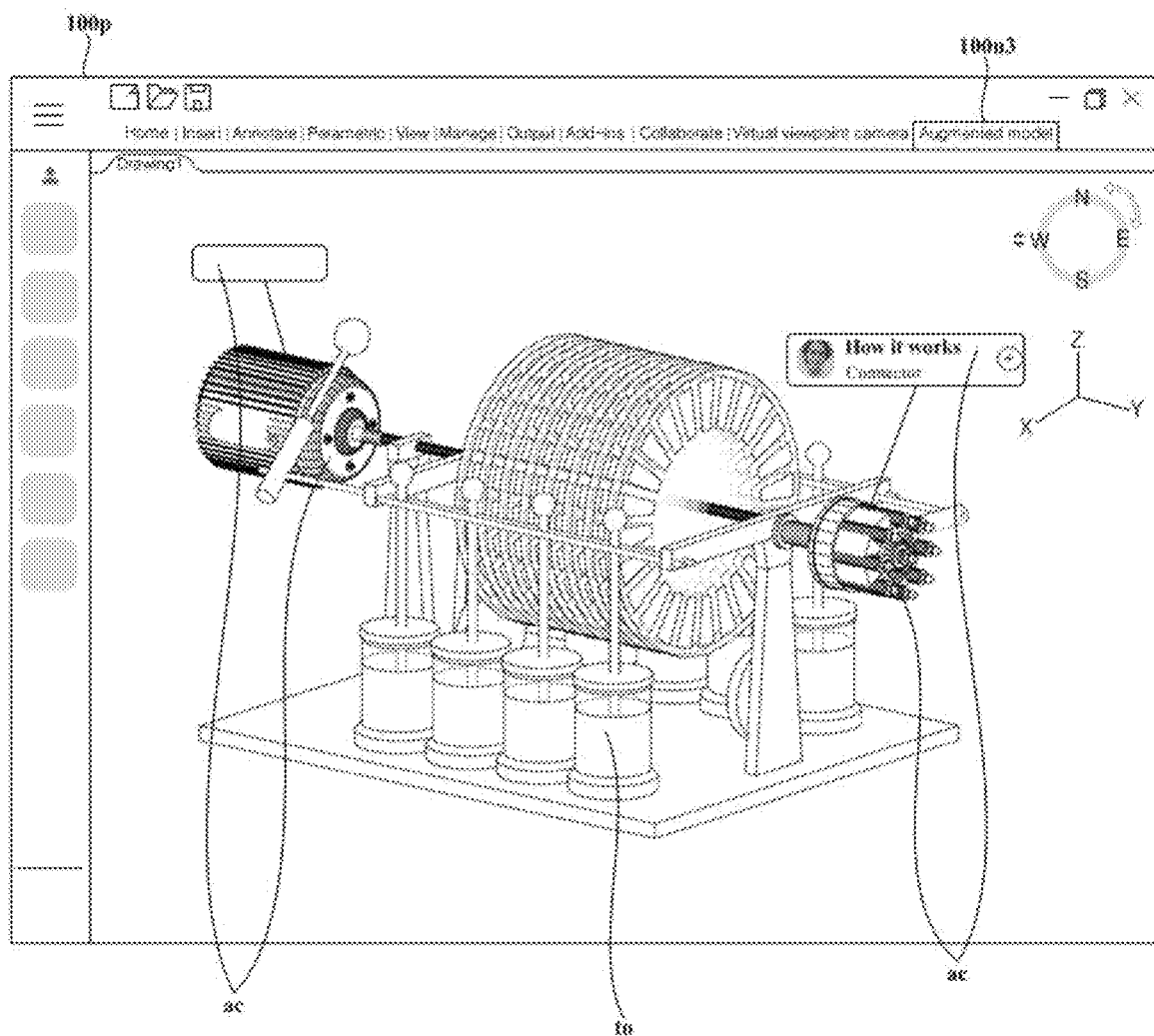

[Fig. 7]
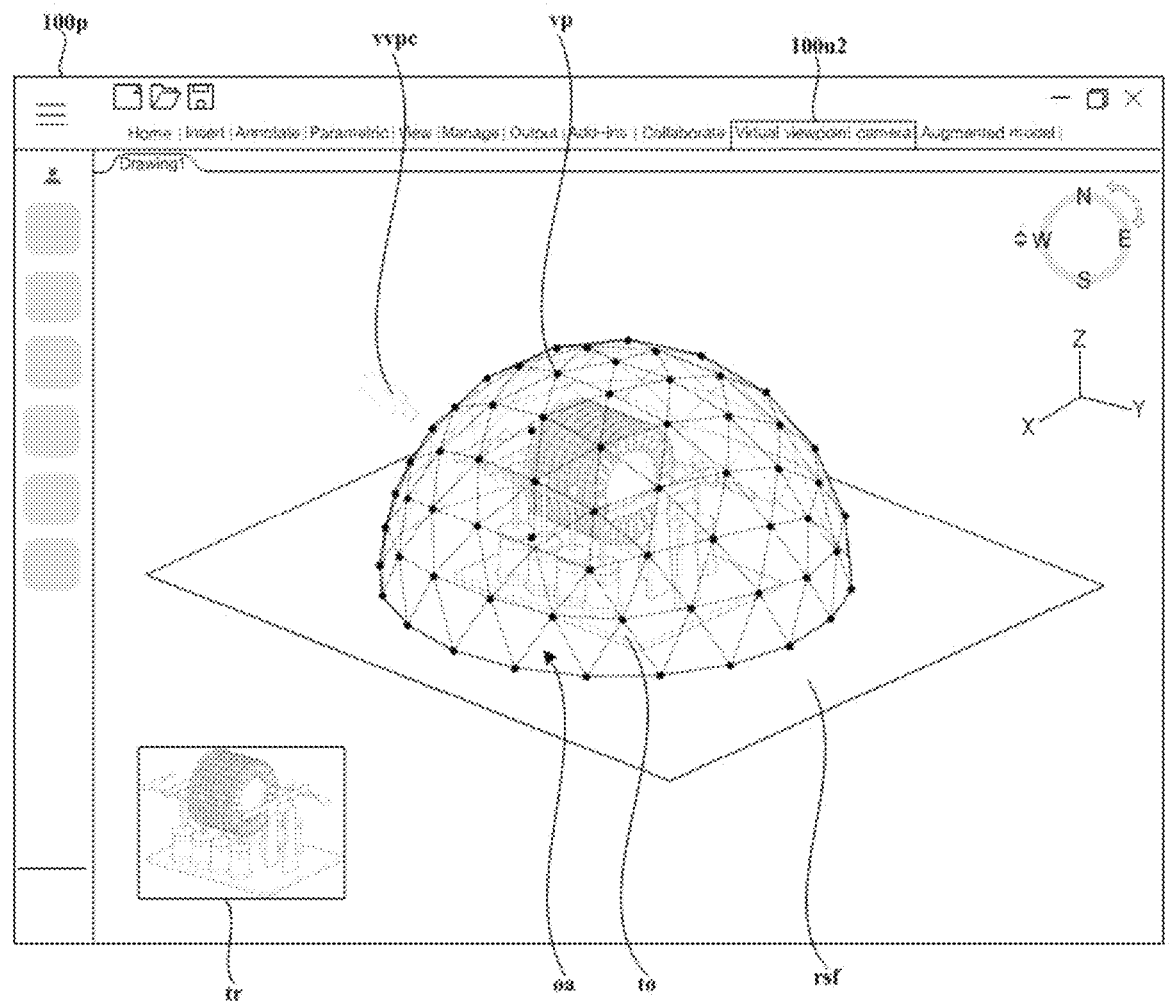

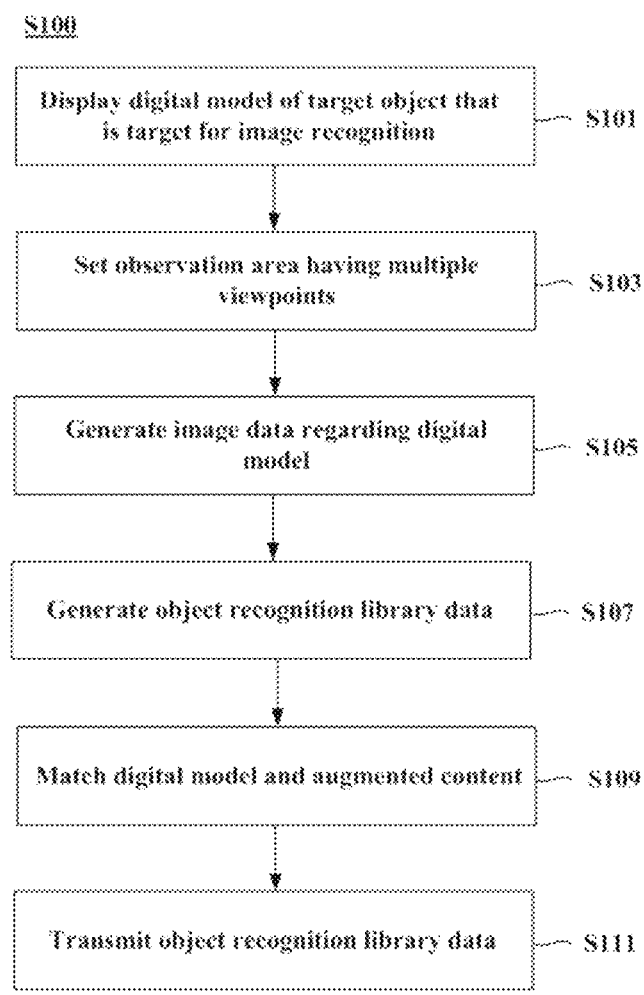
[Fig. 8]

[Fig. 9]
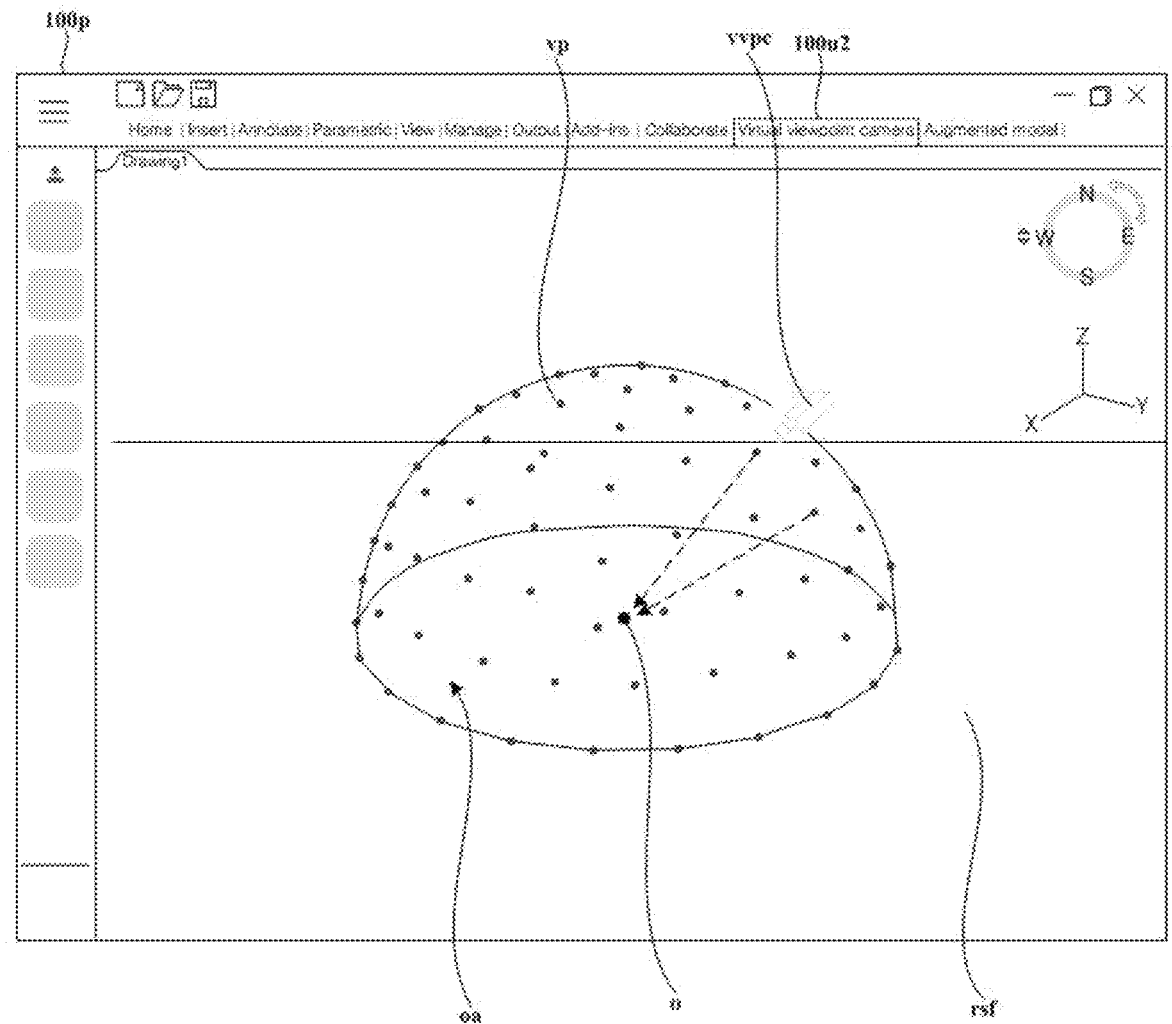

[Fig. 10]
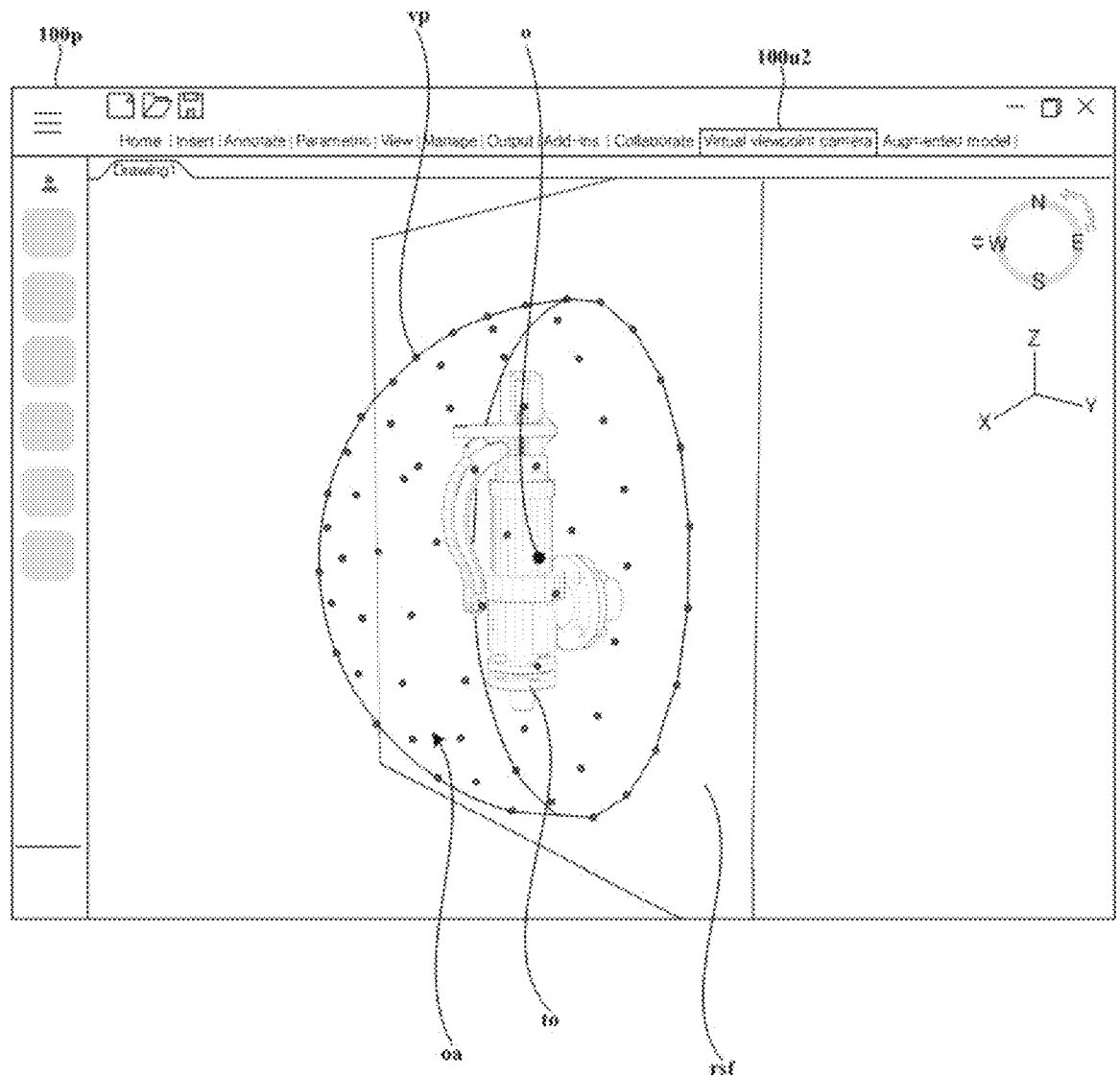

[Fig. 11]
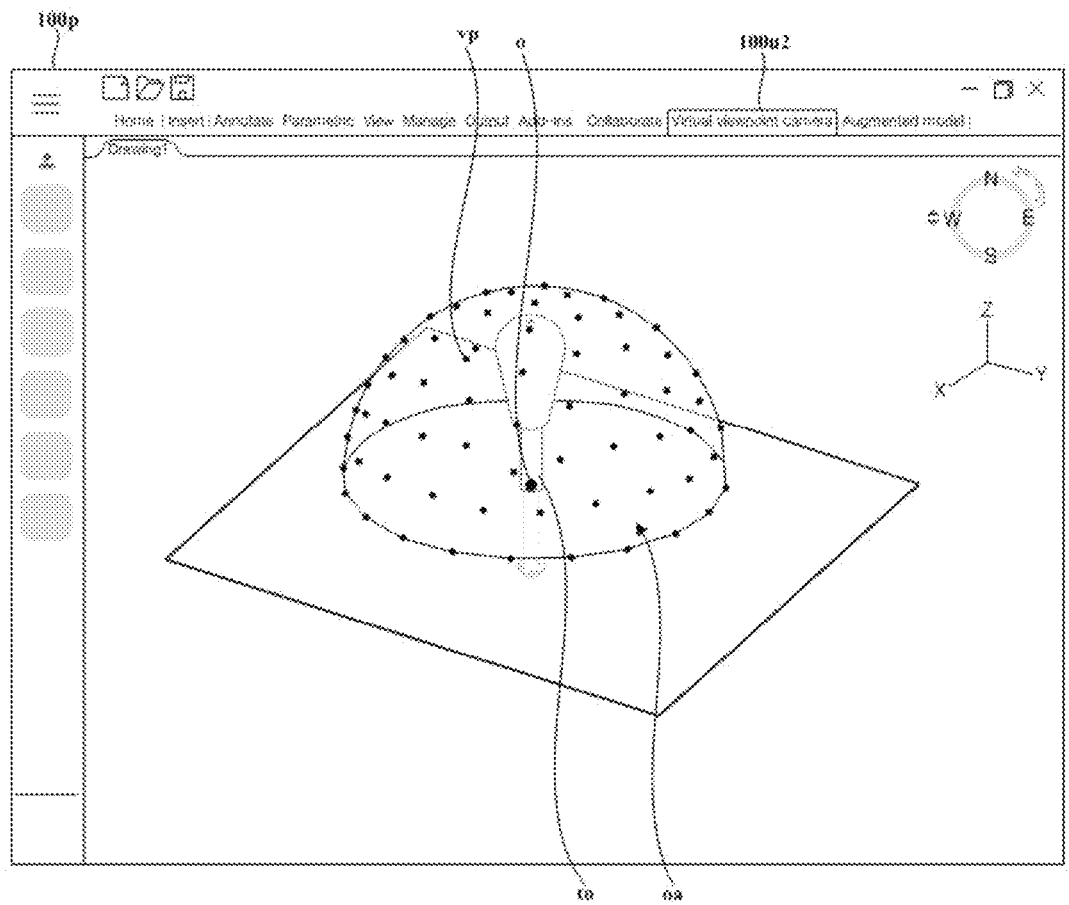
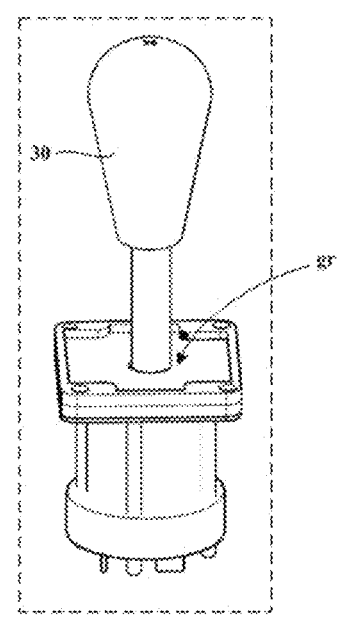

[Fig. 12]
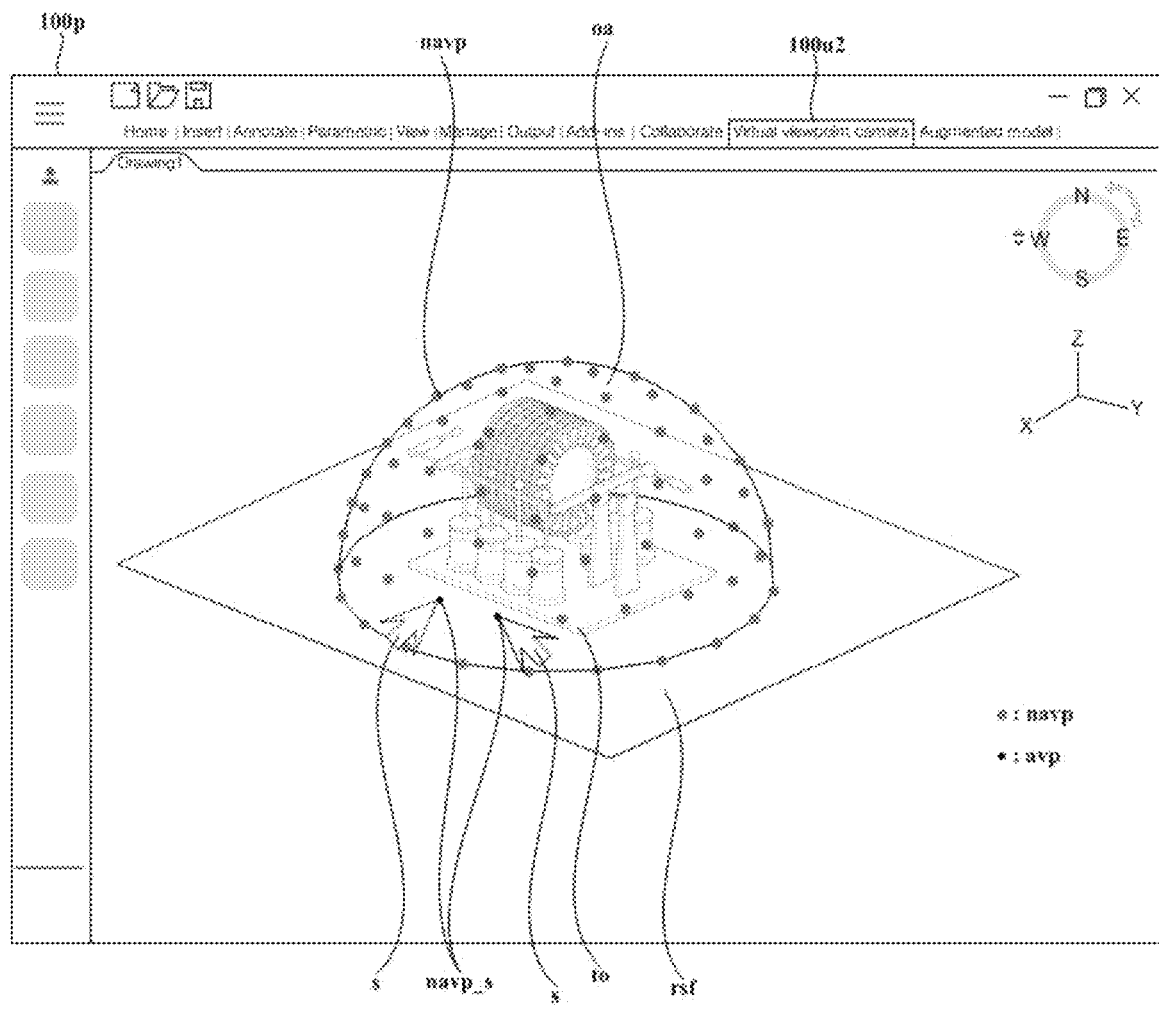

[Fig. 13]
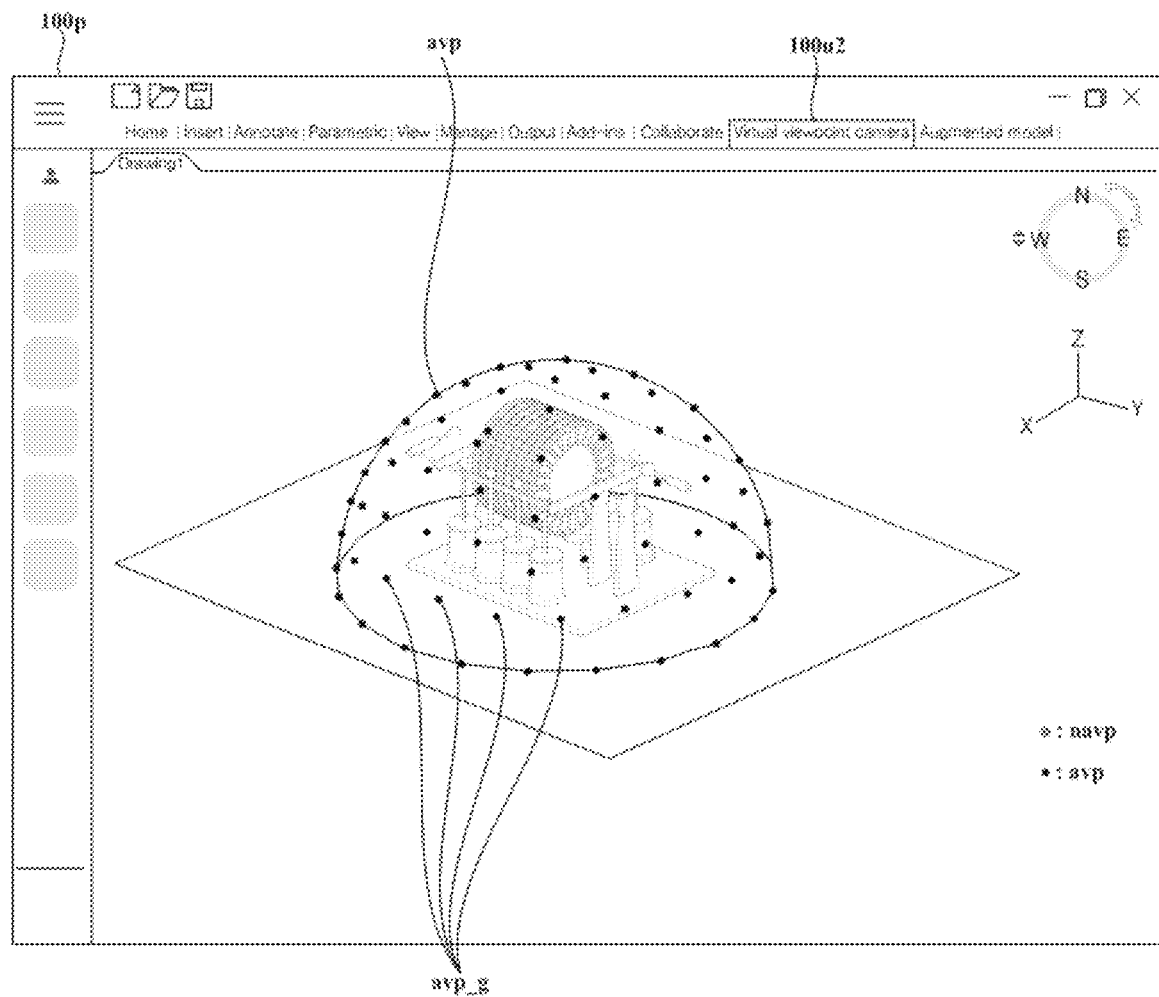

[Fig. 14]
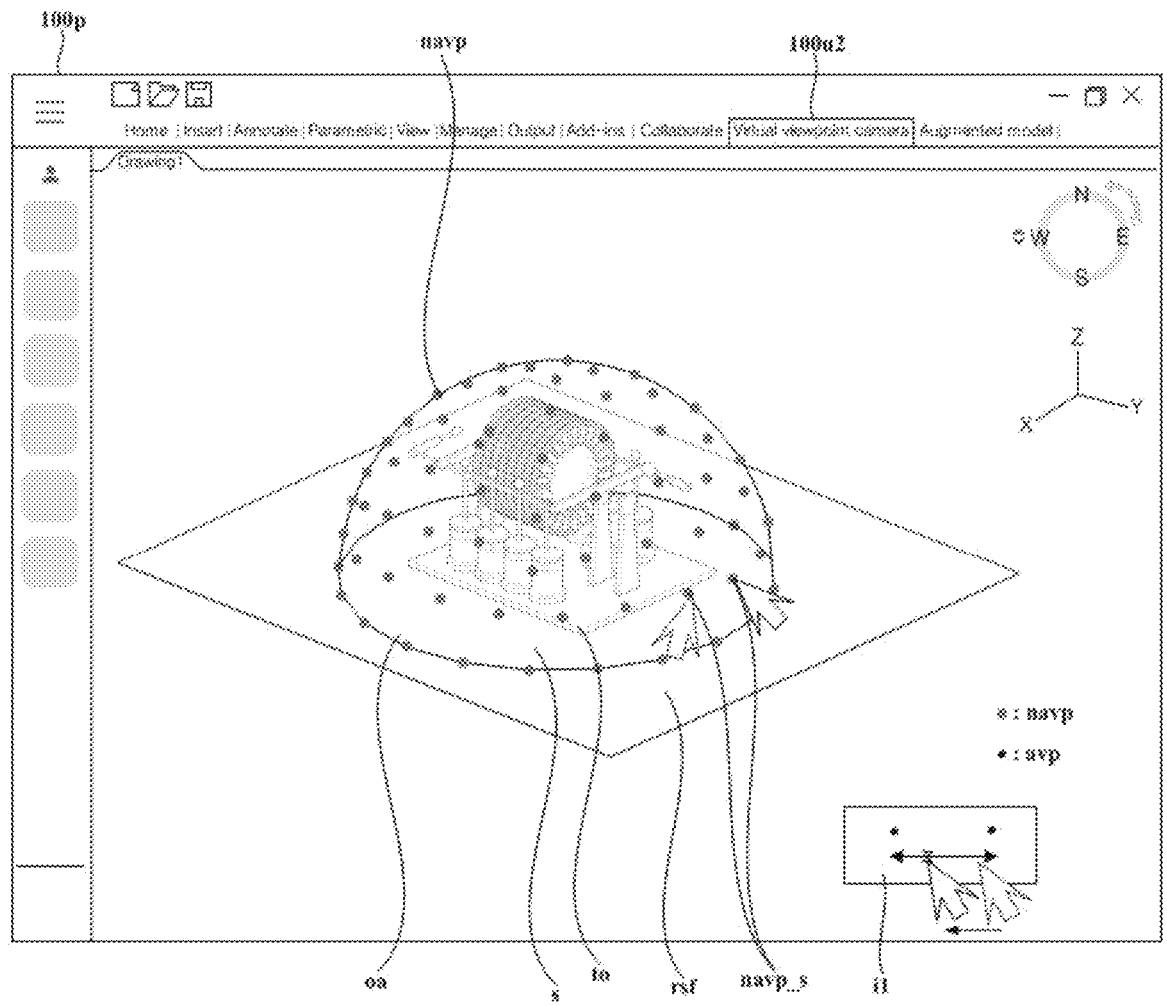

[Fig. 15]
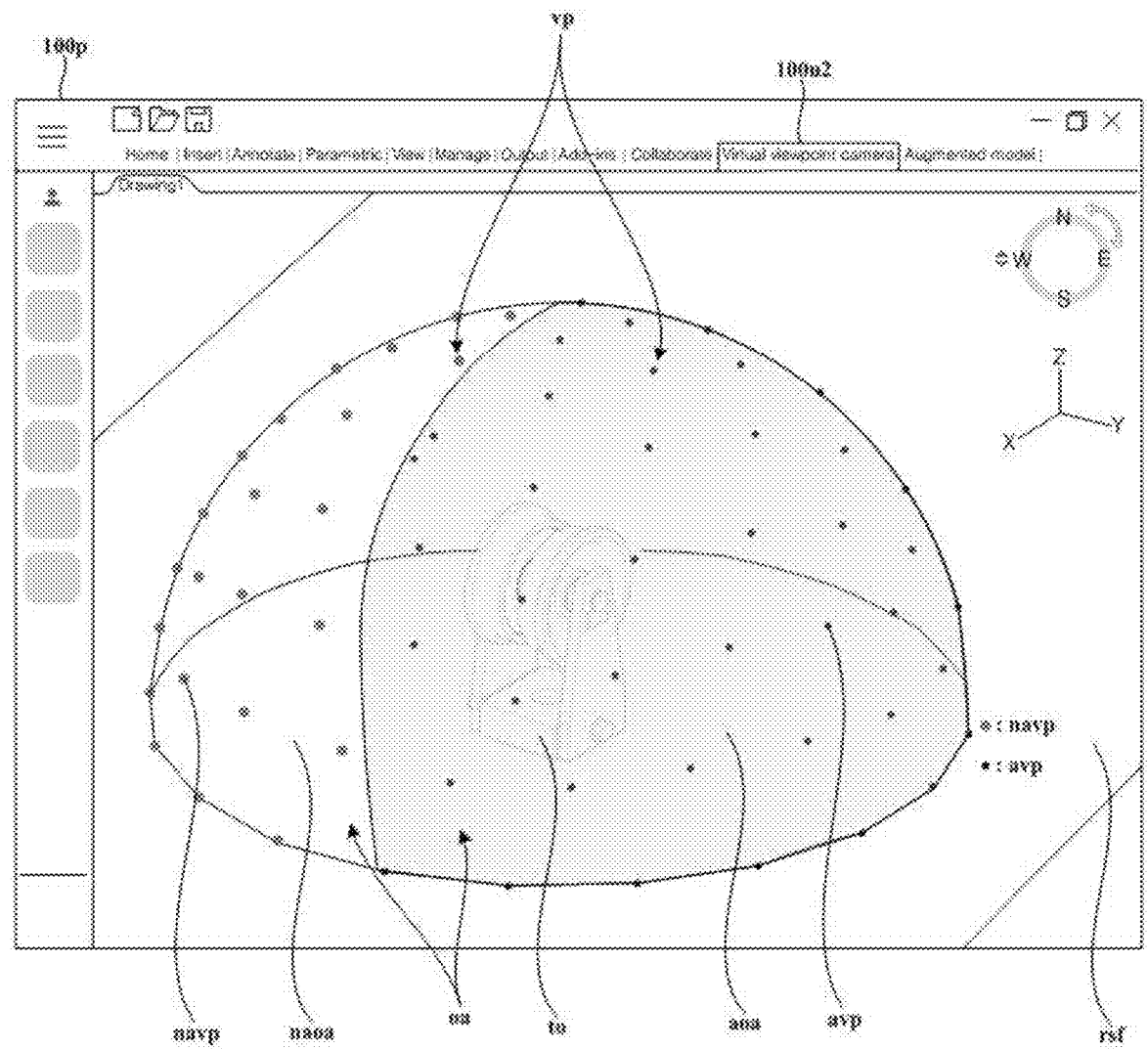

[Fig. 16]
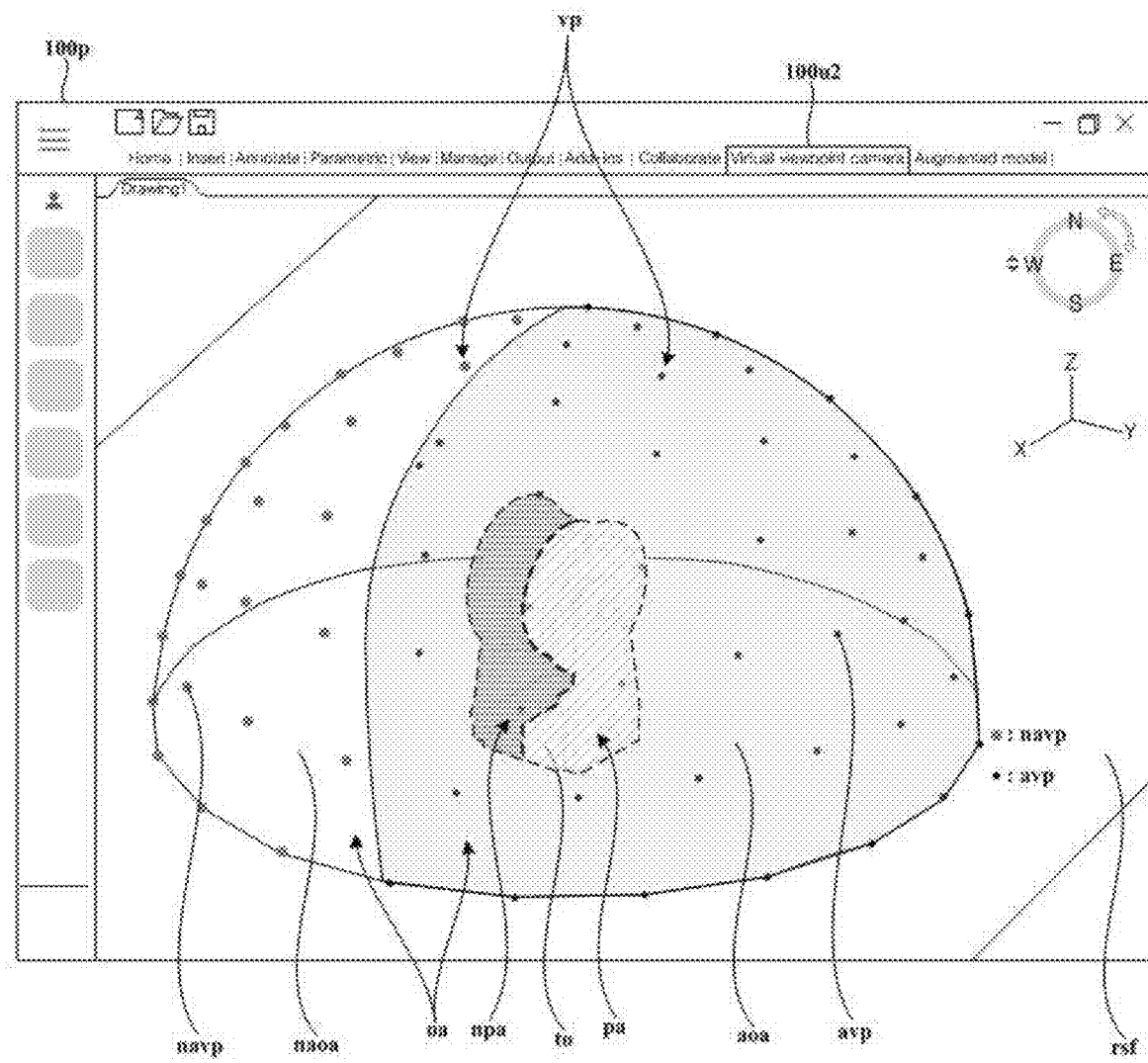

[Fig. 17]
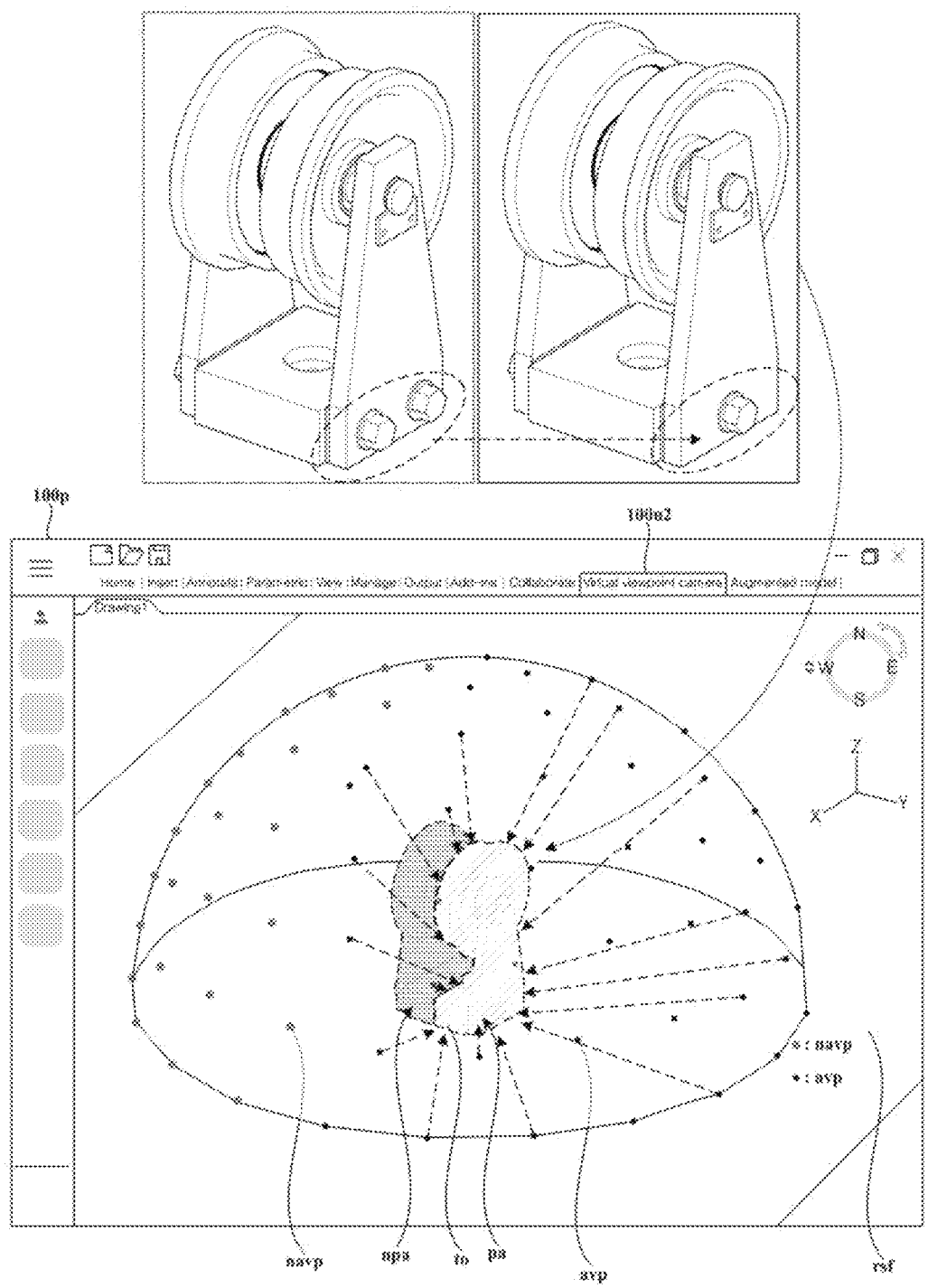

[Fig. 18]
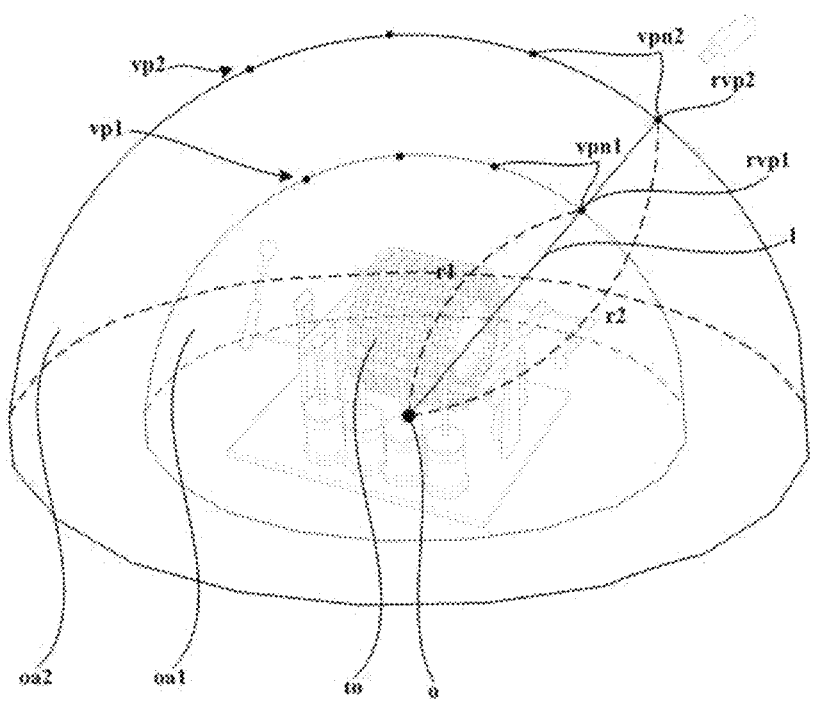

[Fig. 19]
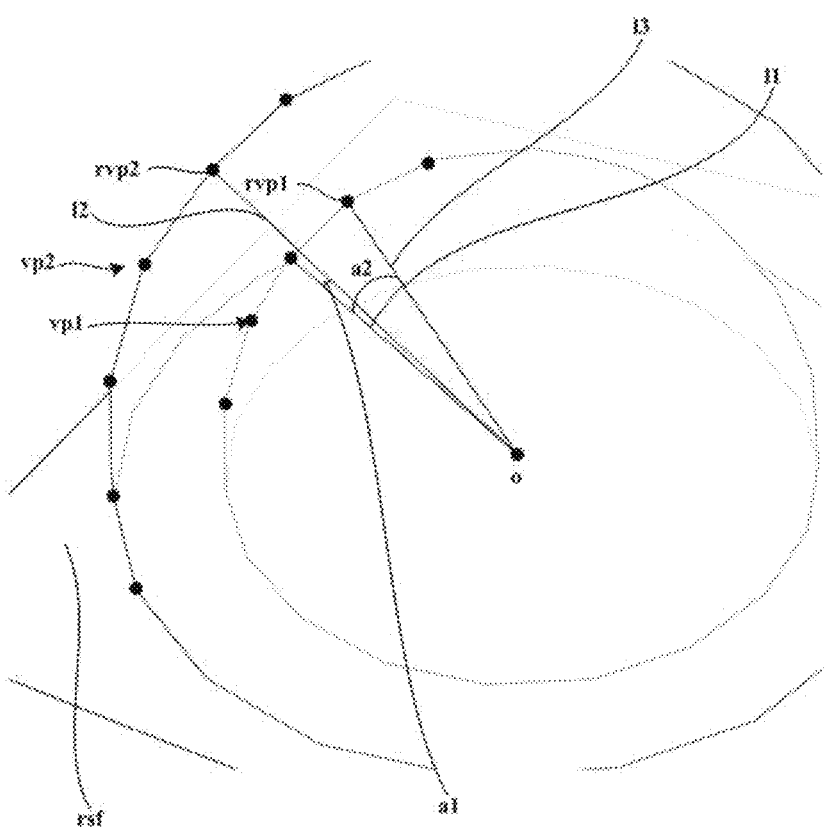

METHOD OF LEARNING A TARGET OBJECT USING A VIRTUAL VIEWPOINT CAMERA AND A METHOD OF AUGMENTING A VIRTUAL MODEL ON A REAL OBJECT IMPLEMENTING THE TARGET OBJECT USING THE SAME

CROSS-REFERENCE TO RELATED APPLICATIONS

This Application claims the benefit of Koran Patent Application No. 10-2021-0191588, filed on Dec. 29, 2021, in the Korean Intellectual Property Office, the entire disclosure of which is incorporated herein by reference for all purposes.

TECHNICAL FIELD

The present disclosure relates to a method of learning a target object using a virtual viewpoint camera and a method of augmenting a virtual model on a real object implementing the target object using the same.

BACKGROUND

Augmented reality is visualization technology capable of intuitively visualizing 3D model information by matching a 3D model on a real image. However, in order to infer a posture of a real model from the point of view of an engineer, already known reference information on an image is required. Conventionally, a method of storing images of a real model when viewed at various angles as a database and comparing an input image with the images in the database or tracking a marker after inputting an initial posture into a system by a user, and the like have been used. However, it is difficult to apply such a method to products in production, and application to commercialization and industry is limited due to a lot of time and effort required for a user to define an initial posture and limited conditions that a marker is required.

Markerless based AR is more general and has wider application than AR using a marker, and thus research on markerless AR has been actively conducted in recent years. Markerless tracking technology introduced to compensate for the shortcomings of marker-based AR literally does not use a marker and has characteristics that graphic information such as general magazines and posters or feature information of real objects can be used as it is. It requires advanced recognition technology and is used in such a manner that a corresponding object is recognized and additional information related thereto is additionally provided.

However, even in the case of the markerless AR, there is a problem in that the accuracy of matching extraction is decreased when environmental information such as brightness and shapes or positions of various objects on a background are changed. Although a method of improving the accuracy of matching using deep learning has also been proposed to improve the accuracy, there is a limit in that it takes considerable effort and time to extract feature information from various and complex real-worlds or real-world objects. In addition, in order to utilize AR technology in the medical field or precision industry that requires a very high level of accuracy of tracking and recognition of real objects and matching between real objects and augmented models or to improve immersion in AR, it is required to rapidly and accurately detect feature information of an object.

SUMMARY

Embodiments provide a method for solving problems such as delay or cost of learning of a real object resulting from a problem of decreasing accuracy due to various environmental factors, a problem requiring advanced vision technology, and the like in learning a real object.

In addition, embodiments provide a method for learning a real object without forcing repeated manufacture of the real object for learning of a new real object or a real object having a partially changed configuration.

Further, embodiments provide a method for efficiently learning a digital model of a target object using a virtual viewpoint camera.

In addition, there is provided a method for learning a digital model of a target object on a computer-aided design program in order to accurately and rapidly learn feature information of a real object.

In addition, there is provided a method for learning a digital model of a target object on a computer-aided design program that increases the accuracy of tracking and recognition of a real object to improve the precision of augmentation of content.

In an aspect, a method of learning a target object implemented on a computer-aided design program of an authoring computing device using a virtual viewpoint camera includes displaying a digital model of a target object that is a target for image recognition, setting at least one observation area surrounding the digital model of the target object and having a plurality of viewpoints on the digital model, generating a plurality of pieces of image data obtained by viewing the digital model of the target object at the plurality of viewpoints of the at least one observation area, and generating object recognition library data for recognizing a real object implementing the digital model of the target object based on the generated plurality of pieces of image data.

In another aspect, the observation area may have a hemispherical shape, and viewpoints closest each other among the plurality of viewpoints may be spaced apart at regular intervals.

In another aspect, the generating the plurality of pieces of image data may include generating a plurality of pieces of image data obtained by viewing the digital model of the target object at the plurality of viewpoints in a direction of an origin of the hemispherical shape.

In another aspect, the setting the observation area may include setting a plurality of hemispherical observation areas each having the same origin and different radii in order to observe the digital model of the target object by distance.

In another aspect, the setting the observation area may include rotating any one of the plurality of hemispherical observation areas around the origin in order to observe the digital model of the target object at different viewpoints by distance.

In another aspect, the method may further include changing a position of the digital model of the target object with respect to the observation area.

In another aspect, the method may further include activating some of a plurality of viewpoints of the observation area and inactivating the remaining viewpoints.

In another aspect, the method may further include adjusting a magnification of the target object based on distances from the viewpoints to the origin such that the digital model of the target object has the same size as a size of the real object.

In another aspect, the method may further include generating augmented content, matching the augmented content to the digital model of the target object, and storing the augmented content.

In another aspect, a method of augmenting a virtual model on a real object implementing a trained target object using a virtual viewpoint camera, performed by an augmented reality program of a terminal including a camera, includes receiving and storing the object recognition library data, acquiring a captured image by photographing a surrounding environment, detecting a real object matching the stored object recognition library data in the acquired captured image, and displaying augmented content on the detected real object such that the augmented content matches the real object.

According to embodiments, it is possible to efficiently learn feature information of a real object and increase the accuracy of tracking and recognition of the real object to improve the precision of augmentation of content.

Further, according to the embodiments, it is possible to provide a method for efficiently learning a digital model of a target object using a virtual viewpoint camera.

In addition, according to the embodiments, it is possible to improve the accuracy of tracking and recognition of a real object by learning a target object while ensuring the uniformity of an observation viewpoint of a digital model of the target object.

In addition, it is possible to learn a real object for realization of AR from the stage of designing a real object before production thereof.

Further, according to the embodiments, it is possible to improve the efficiency of learning of a target object by observing only a design-changed area when the design of some area of the target object is changed to generate and learn image data such that the existing training data for the target object can be updated.

In addition, according to the embodiments, it is possible to efficiently learn a target object in consideration of importance of recognition for each area of a real object depending on the posture and position of the real object.

Further, according to the embodiments, it is possible to generate training data for a target object having characteristics robust to change in the distance between a camera of a user computing device and a real object.

In addition, object recognition library data can be shared and used by multiple user computing devices through a cloud database, and thus it is possible to improve the utilization of training data for a target object.

BRIEF DESCRIPTION OF THE DRAWINGS

FIG. 1 is an exemplary block diagram of a system for realizing a method of learning a target object using a virtual viewpoint camera and augmenting a virtual model on a real object implementing the target object.

FIG. 2 schematically illustrates an exemplary real environment and a real object located in the real environment.

FIGS. 3A and 3B show that a user checks, through a user computer device, a displayed screen obtained by the user computer device tracking and recognizing a real object in a real environment and matching and displaying augmented content on the real object.

FIG. 4, FIG. 5, FIG. 6 and FIG. 7 schematically show various user interface screens of a computer-aided design program according to an embodiment of the present invention.

FIG. 8 is a flowchart of a method of learning a target object using a virtual viewpoint camera according to an embodiment of the present invention.

FIG. 9 shows various user interface screens of the computer-aided design program on which only an observation area is displayed in a state in which a digital model of a target object is omitted in order to describe the observation area.

FIG. 10 is a user interface screen schematically illustrating that the position of the observation area is changed according to change in the position of a reference plane.

FIG. 11 is a user interface screen schematically illustrating an observation area for observing a partial area of a digital model of a target object.

FIG. 12 shows a user interface screen displaying an observation area having inactive viewpoints.

FIG. 13 shows a user interface screen displaying an observation area in which active viewpoints have been set.

FIG. 14 shows a user interface screen for describing a method of adjusting a distance between inactive viewpoints.

FIG. 15 schematically shows a user interface for setting an active observation area and an inactive observation area in an observation area.

FIG. 16 and FIG. 17 illustrate a user interface screen displaying a digital model divided into a projected area and a non-projected area of a target object and an observation area for observing the digital model.

FIG. 18 and FIG. 19 schematically illustrate a plurality of observation areas.

DETAILED DESCRIPTION

The present invention can be modified in various manners and can have various embodiments and thus specific embodiments will be illustrated in the drawings and described in detail in the detailed description. Effects and features of the present invention and a method for achieving the same will become apparent with reference to the embodiments described below in detail in conjunction with the drawings. However, the present invention is not limited to the embodiments described below and may be implemented in various forms. In the following embodiments, terms such as "first" and "second" are used for the purpose of distinguishing one component from another, not in a limiting sense. Further, the singular expression includes the plural expression unless the context clearly dictates otherwise. In addition, terms such as "include" and "have" means that features or components described in the specification are present and do not preclude the possibility that one or more other features or components will be added. In addition, in the drawings, the size of a component may be exaggerated or reduced for convenience of description. For example, since the size and thickness of each component shown in the drawings are arbitrarily indicated for convenience of description, the present invention is not necessarily limited to the illustration.

Hereinafter, embodiments of the present invention will be described in detail with reference to the accompanying drawings, and the same or corresponding components are given the same reference numerals, and redundant description thereof will be omitted.

FIG. 1 is an exemplary block diagram of a system for realizing a method of learning a target object using a virtual viewpoint camera and augmenting a virtual model on a real object implementing the target object. FIG. 2 schematically illustrates an exemplary real environment and a real object located in the real environment and FIGS. 3A and 3B show that a user checks, through a user computer device, a displayed screen obtained by the user computer device tracking and recognizing a real object in a real environment and matching and displaying augmented content on the real object. FIGS. 4 to 7 schematically show various user interface screens of a computer-aided design program according to an embodiment of the present invention. FIG. 8 is a flowchart of a method of learning a target object using a virtual viewpoint camera according to an embodiment of the present invention. FIG. 9 shows various user interface screens of the computer-aided design program on which only an observation area is displayed in a state in which a digital model of a target object is omitted in order to describe the observation area. FIG. 10 is a user interface screen schematically illustrating that the position of the observation area is changed according to change in the position of a reference plane. FIG. 11 is a user interface screen schematically illustrating an observation area for observing a partial area of a digital model of a target object.

System

Referring to FIGS. 1 to 3, a system 10 according to an embodiment of the present invention may include an authoring computing device 100 and a user computing device 200.

The system 10 according to an embodiment of the present invention may learn a target object using a virtual viewpoint camera, track and recognize a real object 30 in a real environment 20 using trained data, and augment various content ac on the real object 30.

The authoring computing device 100 provides an environment for learning a target object by using a virtual viewpoint camera. Further, the authoring computing device 100 may provide environments for creating drawings of 3D models of various objects and environments for creating and editing content such as various augmented models or various types of information on various objects. The authoring computing device 100 may provide various tools for drawing various types of content and may include mechanisms for importing existing files including 2D or 3D objects without being limited thereto.

Computer systems for augmented reality, referred to as the user computing device 200 in an embodiment of the present invention, include electronic devices that create augmented reality environments. Embodiments of an electronic device, user interfaces for the electronic device, and processes associated to use the electronic device will be described. In some embodiments, the user computing device 200 may be a portable communication device, for example, a mobile phone. Further, other portable electronic devices such as laptops or tablet computers with touch-sensitive surfaces (e.g., touch screen displays and/or touchpads) are optionally used. In some embodiments, the user computing device 200 may be a computer device that includes or communicates with one or more cameras rather than a portable communication device. In addition, the user computing device 200 may include is a head mounted display (HMD) that allows a user wearing the device and immersed in an augmented and/or virtual reality environment to navigate the virtual environment and interact with the virtual environment through various different types of inputs. In some embodiments, the user computing device 200 may be commercial products such as HoloLens of Microsoft, Meta-1/Meta-2 Glass of Meta, Google Glass of Google, MD-10 of Cannon, and Magic Leap One Creator Edition of Magic Leap or may be a device providing the same or similar functions.

Computer-Aided Design Program

A computer-aided design program 100$p$ is installed in the authoring computing device 100.

Various Software Developer Kits (SDKs) or ToolKit in the form of libraries may be applied to the computer-aided design program 100$p$.

As shown in FIG. 4, a 2D drawing and a 3D model of the real object 30 can be digitally created before the real object 30 is manufactured by using the computer-aided design program 100$p$ executed in the authoring computing device 100. In addition, as shown in FIGS. 5 and 6, 3D model information or virtual information, which is content ac augmented on the real object 30, can be digitally created by using the computer-aided design program 100$p$. Further, the computer-aided design program 100$p$ is used to implement a mutual physical and visual combination between a digital model to of a target object corresponding to the real object 30 and the augmented content ac and to match the positions of the digital model to and the augmented content ac.

The computer-aided design program 100$p$ may provide a target object modeling interface 100$u$1 for modeling a target object. A 2D drawing or a 3D model of the digital model to of the target object may be created on the target object modeling interface 100$u$1.

As shown in FIG. 7, the computer-aided design program 100$p$ may provide a virtual viewpoint interface 100$u$2. In various embodiments, the virtual viewpoint interface 100$u$2 may be integrated with the target object modeling interface 100$u$1 into one interface. In various embodiments, the virtual viewpoint interface 100$u$2 may be executed according to selection of a specific affordance on the target object modeling interface 100$u$1 to be displayed overlapping the target object modeling interface 100$u$1. In addition, the virtual viewpoint interface 100$u$2 may provide a virtual viewpoint camera vvpc for observing a target object, and a tool for setting an observation area indicating an observation point of the target object and setting a reference plane.

The computer-aided design program 100$p$ may provide an augmented model implementation interface 100$u$3 to provide various tools for drawing augmented models. In various embodiments, the augmented model implementation interface 100$u$3 may be an interface integrated with the target object modeling interface 100$u$1.

Method of Learning Target Object Using Virtual Viewpoint Camera

Referring to FIG. 8, a method S100 of learning a target object using a virtual viewpoint camera according to an embodiment of the present invention includes step S101 of displaying a digital model of a target object that is an image recognition target, step S103 of setting an observation area having a plurality of viewpoints, step S105 of generating image data regarding the digital model, step S107 of generating object recognition library data, step S109 of matching the digital model and augmented content, and step S111 of transmitting the object recognition library data.

Hereinafter, each step will be described in detail with reference to the drawings.

Step S101 of Displaying Digital Model of Target Object that is Image Recognition Target As shown in FIG. 4, the computer-aided design program 100$p$ may display the digital model to of the target object.

The digital model of the displayed target object may be created as a 3D model through the target object modeling interface 100u1. In some embodiments, the computer-aided design program 100p may load and display a pre-stored digital model to of the target object. According to some embodiments, the digital model to of the target object may be created on a different type of computer-aided design program. Further, the computer-aided design program 100p may import and display the digital model to of the target object created on the different type of computer-aided design program.

Step S103 of Setting Observation Area Having Multiple Viewpoints and Step S105 of Generating Image Data Regarding Digital Model Referring to FIGS. 7 and 9, the computer-aided design program 100p may set an observation area oa having a plurality of viewpoints vp.

In some embodiments, the computer-aided design program 100p may provide affordance for selecting display or non-display of the set observation area oa.

The observation area oa may have a hemispherical shape. Accordingly, the plurality of viewpoints vp on the observation area oa maintains the same distance from the origin o of the hemisphere regardless of the positions of the plurality of viewpoints vp, and thus the uniformity of observation with respect to the digital model to of the target object in the observation area oa is ensured.

The plurality of viewpoints vp may be spaced apart from each other by the same distance. The plurality of viewpoints vp may be uniformly spaced apart from each other based on the Euclidean distance. In various embodiments, all of the plurality of viewpoints vp are equal based on the Euclidean distance, and thus the length of a virtual sectoral arc connecting two viewpoints nvp closest each other and the origin o of the hemisphere may be the same for all viewpoints vp. When the distance between the two viewpoints vpn closest each other decreases, the number of pieces of observation data regarding the digital model to of the target object may increase, and when the distance between the two viewpoints vpn closest each other increases, the number of pieces of observation data regarding the digital model to of the target object may decrease. Since increase/decrease in the number of viewpoints vpn on the observation area oa can change linearly according to increase/decrease in the distance between the two viewpoints vpn closest each other, the uniformity of observation with respect to the digital model to of the target object in the observation area oa is ensured. Ensuring the uniformity of observation is important in terms of improving the accuracy of tracking and recognition of the real object 30 and preventing generation of missing observation data at some viewpoints vp among the plurality of viewpoints vp according to positional change such as movement or rotation of the digital model to of the target object in the observation area oa.

The observation area oa may be positioned to surround the digital model to of the target object.

When the digital model to of the target object is raised on the reference plane rsf, for example, at least one point of the digital model to of the target object is in contact with one point of the reference plane rsf. In addition, since the base of the hemisphere is included in the reference plane rsf, the observation area oa forms one closed hemispherical space together with the reference plane rsf, and the digital model to of the target object can be located in the hemispherical space.

In order for the observation area oa to surround the digital model to of the target object, the radius of the hemisphere may have a length such that the observation area oa does not overlap the digital model to of the target object.

The virtual viewpoint camera vvpc of the computer-aided design program 100p may generate image data captured while viewing the digital model to of the target object at each of the plurality of viewpoints vp.

In various embodiments, the computer-aided design program 100p may display image data tr observed by the virtual viewpoint camera vvpc while tracking the virtual viewpoint camera vvpc. In some embodiments, the image data tr observed by the virtual viewpoint camera vvpc may be provided in the form of a moving picture or may be displayed in the form of a static image that changes in real time. In some embodiments, the computer-aided design program 100p may display the positions of the digital model to, the reference plane rsf, and the observation area oa of the target object while changing the positions such that the viewpoints vp sequentially match the position of the virtual viewpoint camera vvpc in a state in which the virtual viewpoint camera vvpc is fixed.

In various embodiments, the virtual viewpoint camera vvpc may generate 2D image data obtained by capturing the digital model to of the target object while facing the origin o at each of the plurality of viewpoints vp.

By capturing the digital model to of the target object at each of the plurality of viewpoints vp on the hemispherical observation area oa, image data obtained by observing the digital model to of the target object at various viewpoints can be generated.

In various embodiments, when the distance from a shooting point to the digital model to at a viewpoint vp is the same as the distance from a camera of the user computing device 200 to the real object 30, the magnification of the digital model to of the target object may be adjusted such that the size of the target object on an image captured at the viewpoint vp is the same as the size of the real object 30 in on image captured by the user computing device 200. That is, it is also possible to cause the digital model to of the target object to be objected in a state in which the size of the digital model to of the target object is adjusted to be the same as the size of the real object 40 by adjusting the magnification of the digital model to of the target object based on the distance between the viewpoint vp on the observation area oa and the origin.

In various embodiments, various 3D environments such as scene lighting or shadows may be rendered on the digital model to of the target object, and the digital model to of the target object may be observed. In addition, the computer-aided design program 100p may provide a tool for adjusting various 3D environments, such as scene lighting or of actions of shadows.

Meanwhile, since the real object 30 is generally located on the ground, the bottom part of the real object 30 as a recognition area of the real object 30 is less important. Accordingly, it is possible to reduce the amount of calculation of data by setting the hemispherical observation area oa as the observation area oa. That is, 2D image data regarding a partial area of the digital model to of the target object corresponding to the remaining area except for the bottom part of the real object 30 which is less important as the recognition area is generated.

In various embodiments, a side partial area other than the bottom surface of the real object 30 may be attached to a background object which is perpendicular to the ground, such as a wall. In this case, a partial area on the side of the real object 30 attached to the background object may be an area that is less important in image recognition. In order to generate 2D image data regarding a partial area of the digital model to of the target object corresponding to the remaining area except for the partial area on the side of the real object 30, which is an area less important in image recognition, the computer-aided design program 100p may provide an interface by which the position of the reference plane rsf can be changed as shown in FIG. 10.

Since the observation area oa of the hemisphere with the reference plane rsf as the bottom surface is set through the computer-aided design program 100p, the position of the observation area oa may also be changed according to change in the reference plane rsf. Further a point on the surface of the digital model to of the target object is in contact with the origin o on the reference plane ref. Here, the point on the surface of the digital model to of the target object may be a point on a non-important area of the digital model to of the target object.

Referring to FIG. 11, at least a partial area of the real object 30 may be accommodated in an arbitrary groove gr of the background object in various embodiments. In this case, a partial area of the real object 30 which is externally viewed on the arbitrary groove gr of the background object may be an important area.

2D image data regarding a partial area of the digital model to of the target object corresponding to the important area of the real object 30 may be generated in order to improve the image recognition ability for the important area in the real object 30 and to improve a learning speed. To this end, the computer-aided design program 100p may provide an interface that allows the position of the digital model to of the target object to be changed or rotated. As the position of the digital model to of the target object changes, the origin o on the reference plane rsf may be a point inside the digital model to of the target object. Accordingly, only a partial area of the digital model to may be included in the hemispherical space forming the closed space by the observation area oa and the reference plane rsf, and the included area may correspond to the important area that is a partial area of the real object 30.

FIG. 12 shows a user interface screen displaying an observation area having inactive viewpoints and FIG. 13 shows a user interface screen displaying an observation area in which active viewpoints are set.

Referring to FIGS. 12 and 13, the computer-aided design program 100p may set an observation area oa having inactive viewpoints navp in various embodiments.

Further, the computer-aided design program 100p may receive a selection s of two arbitrary viewpoints navp_s among the inactive viewpoints navp. The computer-aided design program 100p may set an active viewpoint group avp_g by selecting viewpoints having the same distance as the distance between the selected arbitrary viewpoints navp_s. The active viewpoint group avp_g may include the two arbitrary viewpoints navp_s selected by the user. In addition, in all active viewpoints avp in the active viewpoint group avp_g, the distances between active viewpoints closest each other may the same.

FIG. 14 shows a user interface screen for describing a method of adjusting a distance between inactive viewpoints.

Referring to FIG. 14, in various embodiments, the computer-aided design program 100p may provide an interface i1 by which the relative positions of two inactive viewpoints navp_s closest each other in the observation area oa having the inactive viewpoints navp can be changed to vary the distance therebetween. The computer-aided design program 100p can detect the distance between the two inactive viewpoints navp_s closest each other after the relative positions of the two inactive viewpoints navp_s closest each other are changed in response to the change in the relative positions. In addition, the computer-aided design program 100p may change the positions of all inactive viewpoints navp such that distances between inactive viewpoints navp_s closest each other are the same as the detected distance in all of the inactive viewpoints navp.

In addition, the computer-aided design program 100p may reduce the total number of viewpoints present on the observation area oa as the distance between the inactive viewpoints navp_s closest each other increases and increase the total number of viewpoints present on the observation area oa as the distance between the inactive viewpoints navp_s closest each other decreases to maintain the uniformity of observation viewpoints on the observation area oa.

Further, the computer-aided design program 100p may maintain the uniformity of viewpoint distribution by allowing adjacent viewpoints to be spaced apart by a predetermined distance even when the distance between the inactive viewpoints navp_s closest each other increases or decreases. In addition, in order to avoid generation of similar observation data because adjacent viewpoints vp are excessively close when a digital model to having a simple shape is observed, the distance between the inactive viewpoints navp_s closest each other may be increased to reduce the total number of viewpoints vp on the observation area oa. Further, when a digital model to having a very complex shape is observed, the total number of viewpoints vp on the observation area oa may be increased by reducing the distance between the viewpoints navp_s closest each other. Accordingly, the digital model to can be observed very precisely.

In addition, as described with reference to FIG. 12, observation viewpoints of the digital model to of the target object can be set by converting at least some of the inactive viewpoints navp into active viewpoints avp or converting all inactive viewpoints navp having adjusted distances into active viewpoints avp.

FIG. 15 schematically shows a user interface for setting an active observation area and an inactive observation area in an observation area.

Referring to FIG. 15, when a symmetric view of a digital model to of a target object exists, the symmetric view may be excluded from the observation target in various embodiments.

Specifically, the computer-aided design program 100p may set an inactive observation area naoa having inactive viewpoints navp on the observation area oa.

The computer-aided design program 100p may provide an interface for activation and deactivation of some of the observation areas oa.

The computer-aided design program 100p may set a partial area selected from the observation area oa as an active observation area aoa in response to reception of a signal of an activation command for the selected partial area. In some embodiments, the remaining area of the observation area oa may be set as the inactive observation area naoa when the active observation area aoa is set. In various embodiments, the computer-aided design program 100p may set the viewpoints vp in the active observation area aoa as active viewpoints avp and set the viewpoints vp in the inactive observation area naoa as inactive viewpoints navp. By allowing the digital model to be observed only at the active viewpoints avp, it is possible to remove an observation area that is not required for the digital model to, such as a symmetrical view.

In various embodiments, it is assumed that the digital model to of the target object has a symmetrical shape with respect to the center point of the digital model to of the target object. When the origin of the reference plane coincides with the center point of the digital model to, the plurality of viewpoints vp includes viewpoints corresponding to a symmetrical view. The computer-aided design program 100p may provide an interface for inactivating any one of the viewpoints corresponding to the symmetrical view when observation of the symmetrical view is not required.

FIGS. 16 and 17 illustrate a user interface screen displaying a digital model divided into a projected area and a non-projected area of a target object and an observation area for observing the displayed digital model.

Referring to FIG. 16, the computer-aided design program 100p may provide an interface for activation of some viewpoints vp on an observation area oa having inactive viewpoints navp in various embodiments.

In various embodiments, the computer-aided design program 100p may project an imaging area observed at active viewpoints avp activated among the inactive viewpoints navp onto the digital model to of the target object. As the imaging area is projected onto the digital model to of the target object, a projected area pa and a non-projected area npa may be displayed separately on the digital model to of the target object. The computer-aided design program 100p displays the projected area pa and the non-projected area npa on the digital model to of the target object such that the imaging area observed at the active viewpoints avp is easily identified.

Referring to FIG. 17, in various embodiments, when the design of a partial area of the digital model to of the target object is changed after completion of generation of 2D image data through observation of the digital model to of the target object, it is necessary to re-observe the digital model to of the target object around the design-changed area. In this case, in order to re-observe the digital model to of the target object based on the design-changed area, the projected area pa and the non-projected area npa of the digital model to of the target object are compared, and the design-changed area is caused to be included in the projected area pa. In addition, pre-stored image data may be updated using image data generated through observation of the projected area pa.

In various embodiments, when the position of the digital model to of the target object is changed, the projected area pa and the non-projected area npa on the digital model to of the target object may be changed based on information on the current position of the digital model to of the target object in real time. Accordingly, the user can easily match an important area on the digital model to of the target object and the projected area pa through rotation, enlargement, reduction or position change of the digital model to of the target object.

In various embodiments, the real object 30 may be positioned in various postures or changed to various postures in a real environment. In such a situation, it may be possible to generate observation data regarding the digital model to of the target object while changing the position of the digital model to of the target object in order to improve the accuracy of tracking and recognition of the real object 30.

The computer-aided design program 100p may allow the position of the digital model to of the target object to be changed and generate image data by observing various poses of the digital model to of the target object through the viewpoints vp on the observation area oa.

FIGS. 18 and 19 schematically show a plurality of observation areas.

Referring to FIG. 18, the computer-aided design program 100p may set a plurality of observation areas oa1 and oa2 according to various embodiments.

Although two observation areas oa1 and oa2 are illustrated, the present invention is not limited thereto and a larger number of observation areas may be set.

The plurality of observation areas oa1 and oa2 may have a hemispherical shape surrounding the digital model to of the target object.

In various embodiments, the second observation area oa2 having a second radius r2 may be set by enlarging and scaling a first radius r1 of the first observation area oa1. In some embodiments, the second observation area oa2 is set by enlarging the first radius r1 of the first observation area oa1 having N first viewpoints vp1, and thus the number of second viewpoints vp2 of the second observation area oa2 is N. Accordingly, the distance between viewpoints vpn2 closest each other on the second observation area oa2 may be greater than the distance between viewpoints vpn1 closest each other on the first observation area oa1 by the ratio of radius enlargement scaling.

In various embodiments, an arbitrary first reference viewpoint rvp1 among the first viewpoints vp1 of the first observation area oa1 may be defined. In addition, a second reference viewpoint rvp2 positioned on a virtual straight line l1 passing through the origin o and the first reference viewpoint rvp1 may be defined among the second viewpoints vp2 in the second observation area oa2 obtained by enlarging the first observation area oa1.

The virtual viewpoint camera vvpc may generate first image data captured while viewing the digital model to of the target object at the plurality of first viewpoints vp1 of the first observation area oa1 and generate second image data captured while viewing the digital model to of the target object at the plurality of second viewpoints vp2 of the second observation area oa2. In addition, the second image data may be image data captured from a longer distance compared to the first image data. Accordingly, 2D image data captured at various distances with respect to the digital model to of the target object may be generated.

Referring to FIG. 19, in various embodiments, the second observation area oa2 may rotate about the reference plane rsf at a predetermined angle. The rotation angle may be a first acute angle a1 formed by a virtual first line segment l1 connecting from the origin to the first reference viewpoint rvp1 and a virtual second line segment l2 connecting from the origin to the second reference viewpoint rvp2.

In addition, if a virtual third line segment l3 connecting from the origin to the first viewpoint vp1 closest to the first reference viewpoint rvp1 is defined, the rotation angle of the second observation area oa2 may be set such that a second acute angle a2 formed by the first line segment l1 and the third line segment l3 is greater than the first acute angle a1. Accordingly, image data obtained by observing the digital model to of the target object at various distances from the origin and at various viewpoints that do not overlap with each other between the various distances from the origin may be generated.

Further, more observation areas having different radii may be set in such a manner that the second observation area oa2 is set through enlargement scaling of the radius of the first observation area oa1. Since the radii of these observation areas can be linearly changed, it is possible to generate image data obtained by observing the digital model to of the target object while linearly changing the observation distance of the digital model to of the target object.

Step S107 of Generating Object Recognition Library Data

The computer-aided design program 100p may generate object recognition library data based on image data generated according to imaging of the virtual viewpoint camera vvpc.

The computer-aided design program 100p may generate the object recognition library data by extracting feature information from 2D image data by applying a feature information extraction algorithm.

In some embodiments, the object recognition library data may include position information of each viewpoint vp, position information of the digital model to of the target object, and relative position information therebetween. In some embodiments, the object recognition library data may include radius information of the observation area oa which is the distance between a viewpoint vp and the origin o.

In various embodiments, the computer-aided design program 100p may detect feature information having robust characteristics regarding the digital model to of the target object by learning 2D image data through a deep learning neural network.

In various embodiments, the computer-aided design program 100p may group 2D image data obtained by observing the digital model to observed at adjacent viewpoints and learn the grouped 2D image data through a deep learning network to detect feature information having robust characteristics regarding the digital model to of the target object.

Step S109 of Matching Digital Model and Augmented Content

Referring back to FIGS. 5 and 6, the computer-aided design program 100p may provide various tools for creating augmented content ac to be matched with the digital model to of the target object. In various embodiments, the computer-aided design program 100p may load and display pre-stored augmented content ac. According to some embodiments, the augmented content ac may be created by a different type of computer-aided design program. In addition, the computer-aided design program 100p may import and display the augmented content ac created by the different type of computer-aided design program.

The computer-aided design program 100p provides an interface that enables the displayed augmented content ac to be moved, rotated, enlarged, and reduced on the x-axis, y-axis, and z-axis such that sufficient and precise matching of the augmented content ac and the digital model to of the target object can be achieved. It is noted that matching includes not only physical contact between the augmented content ac and the digital model to of the target object but also setting of a distance between the digital model to and the target object and setting of a display position of the augmented content ac based on the digital model to of the target object. In addition, the computer-aided design program 100p may provide a tool for providing dynamic properties such that the augmented content ac can be simulated while the position and/or shape thereof are changed over time. In addition, the computer-aided design program 100p may provide an interface for adding various types of information as well as an augmented model.

Step S111 of Transmitting Object Recognition Library Data

The authoring computing device 100 may transmit object recognition library data to an external device in response to a transmission request from the external device. Here, the external device may be the user computing device 200, but is not limited thereto.

The user computing device 200 may receive the object recognition library data from, for example, the authoring computing device 100 storing the object recognition library data.

Referring back to FIGS. 3A and 3B, the user computing device 200 may track the real object 30 corresponding to the digital model to of the target object from objects in the real environment 20 being imaged. The user computing device 200 may recognize the real object 30 by applying a feature information extraction algorithm to extract feature information from an image captured while tracking the real object and comparing the feature information with the object recognition library data.

The feature information extraction algorithm applied in the computer-aided design program 100p may be the same as an algorithm on a terminal, but is not limited thereto. It is considered that the virtual space where the digital model to of the target object on the computer-aided design program 100p is located has a background of a single color or does not have a background object. A feature information extraction algorithm that is not robust against the presence of complex objects or backgrounds of complex colors but is focused only on the ability to extract feature information of the digital model to of the target object and has a high computational amount may be applied to the computer-aided design program 100p. On the other hand, a feature information extraction algorithm having robust characteristics in various backgrounds or backgrounds of various conditions may be applied to the user computing device 200. However, the present invention is not limited thereto.

When the user computing device 200 recognizes the real object 30, the user computing device 200 may call the augmented content ac stored in the database, the authoring computing device 100, or a server, match the augmented content ac and the real object 30, render and augment the same, and adjust event flags such that a stored interaction event can operate.

An augmented virtual model or other virtual information may be observed in different sizes from various aspects according to the angle and the observation distance at which the camera of the user computing device 200 observes the real object 30. In various embodiments, the user computing device 200 may display various types of information related to the real object 30.

In various embodiments, the user may manipulate the augmented content ac displayed on the user computing device 200 by operating the user computing device 200.

In various embodiments, the user computing device 200 provides an interface by which the user can move, rotate, enlarge, and reduce the displayed augmented content ac on the x-axis, y-axis, and z-axis to sufficiently observe the augmented content ac in detail. In addition, the user computing device 200 may allow various types of information as well as augmented models to be added to provide a large amount of information rather than static information. In addition, the user computing device 200 may be used to check a new part displayed as an augmented model in an existing device before and after installation of the new part, to augment a virtual structure in a part that is not easily checked with the naked eyes, or to simulate an augmented model changing over time as a 4D concept in which a time dimension is added to three dimensions of x-axis, y-axis and z-axis. In various embodiments, the user computing device 200 may provide an interaction function, and in some embodiments, an additional controller may be used to implement interaction.

The specific implementations described in the present invention are only examples and do not limit the scope of the present invention. For brevity of the specification, descriptions of conventional electronic components, control systems, software, and other functional aspects of the systems may be omitted. In addition, connections of lines or connecting members between components shown in the drawings exemplify functional connections and/or physical or circuit connections, and in an actual device, may be represented as various functional connections, physical connections, or circuit connections that are replaceable or additional. Furthermore, unless there is a specific reference such as "essential" or "important", they may not be necessary components for the application of the present invention.

Although the present invention has been described in detail with reference to preferred embodiments of the present invention, those skilled in the art or those having ordinary knowledge in the art will appreciate that various modifications and variations of the present invention can be made without departing from the spirit and technical scope of the present invention described in the claims. Accordingly, the technical scope of the present invention should not be limited to the detailed description of the specification, but should be defined by the claims.

What is claimed is:

1. A method of learning a target object implemented on a computer-aided design program of an authoring computing device using a virtual viewpoint camera, comprising:
    displaying a digital model of a target object that is a target for image recognition;
    setting at least one observation area surrounding the digital model of the target object and having a plurality of viewpoints on the digital model, wherein the viewpoints include a plurality of active viewpoints and a plurality of inactive viewpoints;
    generating a plurality of pieces of image data obtained by viewing the digital model of the target object at the plurality of viewpoints of the at least one observation area; and
    generating object recognition library data for recognizing a real object implementing the digital model of the target object based on the generated plurality of pieces of image data,
    wherein the observation area has a hemispherical shape, and the viewpoints closest to each other among the plurality of viewpoints are spaced apart at regular intervals,
    wherein an observation viewpoint of the digital model is set by converting at least some of the inactive viewpoints into the active viewpoints or converting all inactive viewpoints into the active viewpoints, wherein the all inactive viewpoints are equally adjusted the distances between the plurality of inactive points.

2. The method of claim 1, wherein the generating the plurality of pieces of image data comprises generating a plurality of pieces of image data obtained by viewing the digital model of the target object at the plurality of viewpoints in a direction of an origin of the hemispherical shape.

3. The method of claim 1, wherein the setting the observation area comprises setting a plurality of hemispherical observation areas each having the same origin and different radii in order to observe the digital model of the target object by distance.

4. The method of claim 3, wherein the setting the observation area comprises rotating any one of the plurality of hemispherical observation areas around the origin in order to observe the digital model of the target object at different viewpoints by distance.

5. The method of claim 1, further comprising changing a position of the digital model of the target object with respect to the observation area.

6. The method of claim 5, further comprising allowing the digital model to be observed only at the active viewpoints among the plurality of viewpoints of the observation area.

7. The method of claim 2, further comprising adjusting a magnification of the target object based on distances from the viewpoints to the origin such that the digital model of the target object has the same size as a size of the real object when the distance from a shooting point to the digital model at a viewpoint is the same as the distance from a camera of a user computing device to the real object.

8. The method of claim 1, further comprising generating augmented content, matching the augmented content to the digital model of the target object, and storing the augmented content.

9. A method of augmenting a virtual model on a real object implementing a trained target object using a virtual viewpoint camera, performed by an augmented reality program of a terminal including a camera, the method comprising:
    receiving and storing the generated object recognition library data of claim 1;
    acquiring a captured image by photographing a surrounding environment;
    detecting a real object matching the stored object recognition library data in the acquired captured image; and
    displaying augmented content on the detected real object such that the augmented content matches the real object.

* * * * *